(12) United States Patent
Nanri

(10) Patent No.: US 7,797,812 B2
(45) Date of Patent: Sep. 21, 2010

(54) METHOD OF MANUFACTURING A DISC BRAKE

(75) Inventor: Keisuke Nanri, Yamanashi-ken (JP)

(73) Assignee: Hitachi, Ltd., Tokyo (JP)

( * ) Notice: Subject to any disclaimer, the term of this patent is extended or adjusted under 35 U.S.C. 154(b) by 402 days.

(21) Appl. No.: 11/898,993

(22) Filed: Sep. 18, 2007

(65) Prior Publication Data

US 2008/0034572 A1 Feb. 14, 2008

Related U.S. Application Data

(62) Division of application No. 10/996,393, filed on Nov. 26, 2004, now abandoned.

(30) Foreign Application Priority Data

Nov. 28, 2003 (JP) .............................. 2003-399553

(51) Int. Cl.
 F16D 55/00 (2006.01)
 F16D 55/18 (2006.01)
(52) U.S. Cl. ................................... 29/527.6; 188/73.46
(58) Field of Classification Search ................ 29/527.5, 29/527.6; 188/73.46, 73.47, 370, 72.5, 72.4, 188/71.6, 71.5, 73.1, 155
See application file for complete search history.

(56) References Cited

U.S. PATENT DOCUMENTS

| 6,092,631 | A | 7/2000 | Matsuzaki et al. |
| 6,257,378 | B1 * | 7/2001 | Girkin et al. ............. 188/73.31 |
| 6,367,595 | B1 | 4/2002 | Mori et al. |
| 6,446,766 | B1 | 9/2002 | Cornolti et al. |
| 2006/0175156 | A1 | 8/2006 | Sato et al. |

FOREIGN PATENT DOCUMENTS

| DE | 29 50 660 | 7/1981 |
| DE | 39 06 162 | 8/1990 |
| EP | 0 907 034 | 4/1999 |
| JP | 46-24760 | 8/1971 |

(Continued)

OTHER PUBLICATIONS

Notice of Reasons for Rejection (in English language) dated Sep. 24, 2008 in corresponding Japanese Patent Application No. 2003-399554.

(Continued)

*Primary Examiner*—John C Hong
(74) *Attorney, Agent, or Firm*—Wenderoth, Lind & Ponack, L.L.P.

(57) ABSTRACT

A method of manufacturing a disc brake in which a pair of pads are disposed on opposite sides of a disc. A caliper body extends over the disc. The method includes forming, in the caliper body, a prepared hole for a bore into which a piston is slidably fitted and a recess extending from a bottom portion of the prepared hole outwardly in a radial direction of the prepared hole. The bore and recess are formed by means of a core during casting. A linear passage opening is formed by cutting from an exterior surface of the caliper body so as to communicate with the recess. Thus, an opening for forming a brake fluid passage can be easily formed by machining, and the position of the opening can be determined with a high degree of freedom.

20 Claims, 15 Drawing Sheets

FOREIGN PATENT DOCUMENTS

| | | |
|---|---|---|
| JP | 59-42328 | 3/1984 |
| JP | 63-246522 | 10/1988 |
| JP | 4-327338 | 11/1992 |
| JP | 5-96576 | 12/1993 |
| JP | 8-121510 | 5/1996 |
| JP | 10-30660 | 2/1998 |
| JP | 11-82569 | 3/1999 |
| JP | 11-117964 | 4/1999 |
| JP | 2000-179595 | 6/2000 |
| JP | 2000-213576 | 8/2000 |
| JP | 2000-283190 | 10/2000 |
| JP | 2001-27267 | 1/2001 |
| JP | 2001-107994 | 4/2001 |
| JP | 2002-213502 | 7/2002 |
| JP | 2003-28211 | 1/2003 |
| WO | 99/20417 | 4/1999 |
| WO | 03/071152 | 8/2003 |

OTHER PUBLICATIONS

Decision of Rejection (in English language) dated Aug. 25, 2009 in corresponding Japanese Patent Application No. 2003-99554.

Notice of Reasons for Rejection (in English language) dated Aug. 19, 2008 in corresponding Japanese Patent Application No. 2003-399553.

Decision of Rejection (in English language) dated Jul. 28, 2009 in corresponding Japanese Patent Application No. 2003-399553.

* cited by examiner

US 7,797,812 B2

METHOD OF MANUFACTURING A DISC BRAKE

This is a divisional application of Ser. No. 10/996,393, filed Nov. 26, 2004 now abandoned.

BACKGROUND OF THE INVENTION

The present invention relates to a disc brake for a vehicle.

In a disc brake for a vehicle, a pair of pads are disposed on opposite sides of a disc, and pistons, each of which is disposed on a side opposite to the disc relative to the corresponding pad, are adapted to press the pads against the disc, to thereby apply a braking force to the vehicle. The pistons are slidably fitted into bores formed in a caliper body. In a disc brake of this type disclosed in U.S. Pat. No. 6,367,595, a bottom portion of each of the bores for the pistons is formed by a member externally attached to an open end of the bore. Before the open end of the bore is closed by this bottom portion, a tool is inserted from the open end of the bore, and a passage opening is formed by cutting from a portion in the bore on a side of the bottom portion thereof, and then the bore is closed by threadably engaging the bottom portion with the caliper body.

In the above-mentioned disc brake, however, the passage opening must be formed by cutting from a predetermined position in the bore while avoiding interference with the open end of the bore before it is closed. Therefore, the passage opening must be formed with high machining accuracy, and an operation for forming the passage opening becomes cumbersome. This lowers production efficiency. Further, since the passage opening must be formed while avoiding interference with the open end of the bore, a degree of freedom of design when determining the position of the passage opening is low.

SUMMARY OF THE INVENTION

Therefore, it is an object of the present invention to provide a disc brake in which an opening for forming a brake fluid passage can be easily formed, thus achieving high production efficiency, and which enables the position of the opening for the brake fluid passage to be determined with a high degree of freedom of design.

In order to achieve the above-mentioned object, the present invention provides a disc brake comprising a pair of pads disposed on opposite sides of a disc, a caliper disposed so as to extend over the disc, the caliper being adapted to be mounted on a vehicle body, and at least one piston slidably held in the caliper, the piston being located on a side opposite to the disc relative to the corresponding pad. The caliper includes a prepared hole to be machined to form at least one bore into which the piston is slidably fitted, and a recess extending from a bottom portion of the prepared hole outwardly in a radial direction of the prepared hole. The prepared hole and the recess are formed by means of a core when the caliper is cast. A linear passage opening is formed so as to extend from an exterior surface of the caliper to the recess.

According to one embodiment of the present invention, the caliper includes a plurality of bores arranged in a spaced relationship in a direction of rotation of the disc, and a communication passage for communication between the adjacent bores is formed in the caliper by means of the core when the caliper is cast. The recess is formed at a position corresponding to the top of the uppermost bore when the caliper is mounted on the vehicle body. The passage opening is formed so as to extend from the exterior surface of a portion of the caliper that is located at an upper position when the caliper is mounted on the vehicle body.

According to another embodiment of the present invention, the plurality of bores are disposed on each of opposite sides of the disc in an axial direction of the disc, and a linear communication opening is formed so as to extend from the exterior surface of the caliper and to intersect the passage opening. The communication opening is adapted to form a part of a connection passage for allowing communication between the bores disposed on opposite sides of the disc in the axial direction of the disc.

DETAILED DESCRIPTION OF THE INVENTION

Figure 1:
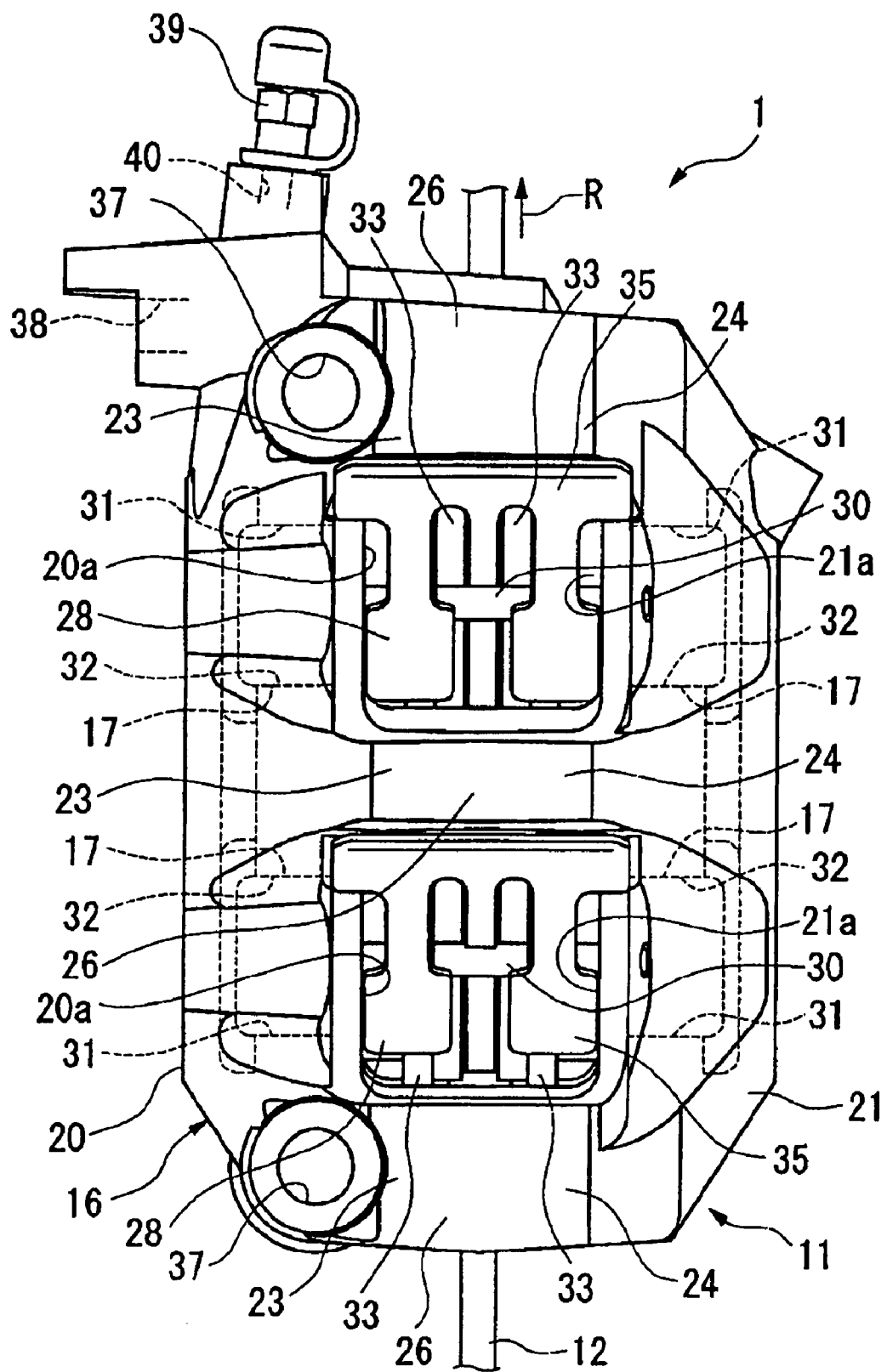
FIG. 1 is a front view showing a disc brake according to an embodiment of the present invention.

Hereinbelow, embodiments of the present invention are described, referring to the drawings.

Figure 2:
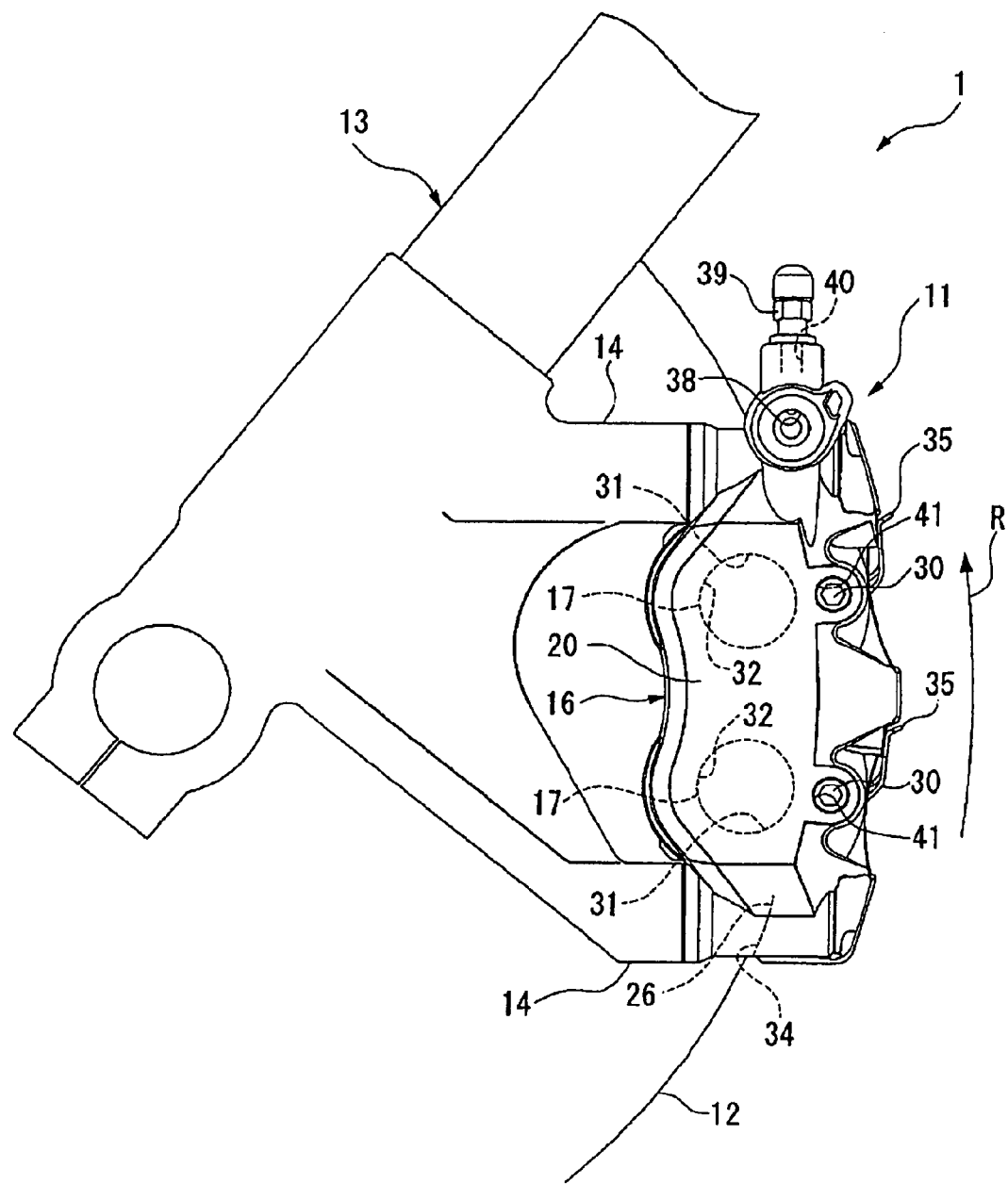
FIG. 2 is a side view showing the disc brake according to the embodiment of the present invention.

In FIGS. 1 and 2, reference numeral 1 denotes an opposed-piston type disc brake. A caliper 11 of this disc brake is an opposed-piston type caliper 11. The caliper 11 comprises a caliper body 16 which extends over a disc 12, as shown in FIG. 1, and which is mounted on a mount portion 14 of a front fork 13 as a non-rotational portion of a body of a vehicle (a motor cycle in this embodiment), as shown in FIG. 2. The caliper 11 further comprises a plurality of pairs (two pairs in this embodiment) of pistons 17 slidably provided in the caliper body 16, so as to face each other with the disc 12 being disposed therebetween. In the following description, a radial direction of the disc 12, an axial direction of the disc 12, a direction of rotation of the disc 12 refer to those in a state in which the caliper body is mounted on a vehicle body. In FIGS. 1 and 2, an arrow R indicates the direction of rotation of the disc 12 when a vehicle travels in a forward direction.

Figure 3:
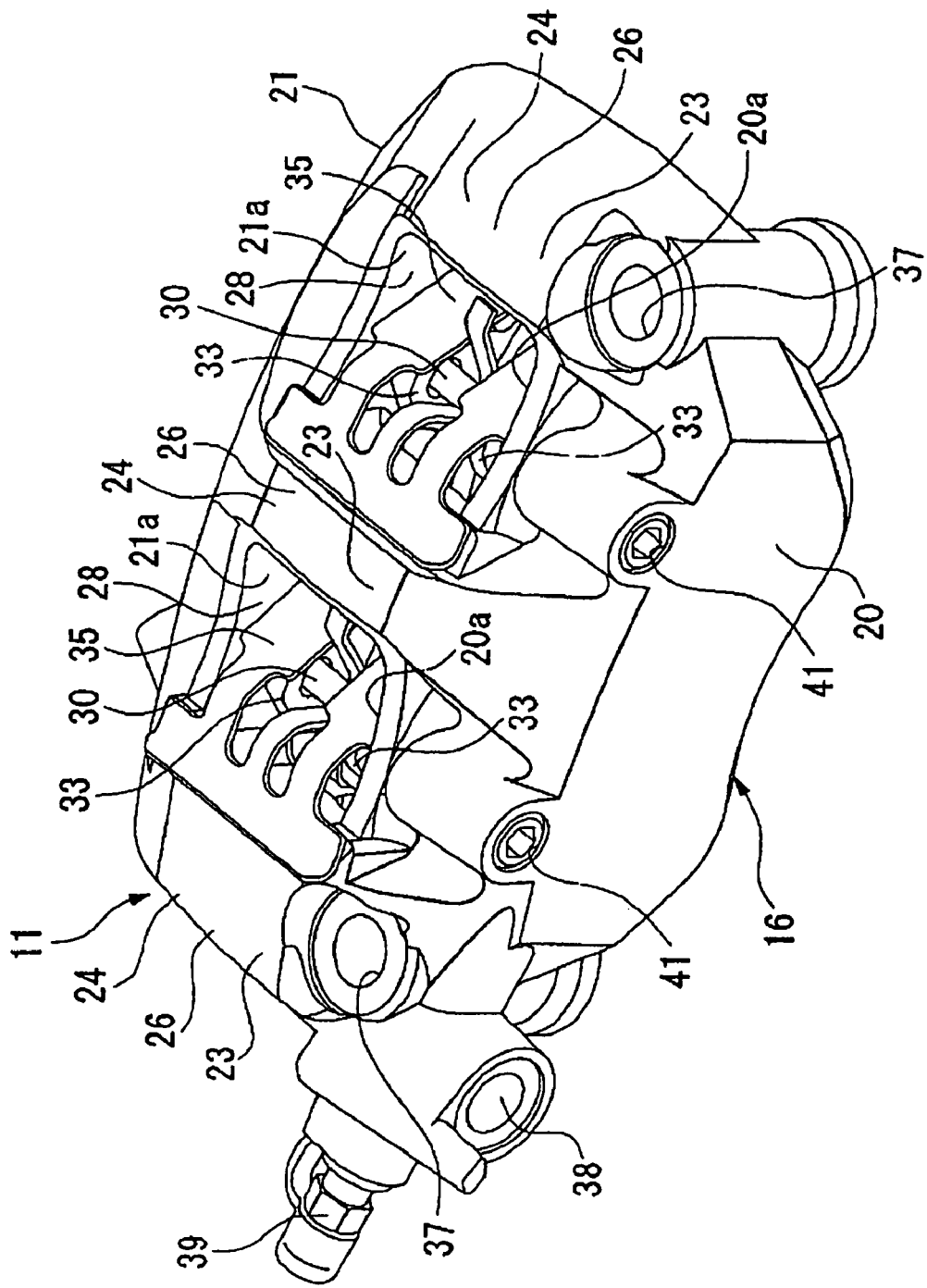
FIG. 3 is a perspective view showing the disc brake according to the embodiment of the present invention.

As shown in FIGS. 1 to 3, the caliper body 16 is a one-piece member comprising an outer-side cylinder portion 20 disposed on an outer side of the disc 12 (a side opposite to a wheel) and an inner-side cylinder portion 21 disposed on an inner side of the disc 12 (a side on which a wheel is provided). The caliper body 16 further comprises a plurality (three in this embodiment) of outer-side torque bearing portions 23 projecting from the outer-side cylinder portion 20 towards the inner side of the disc, the outer-side torque bearing portions 23 being arranged in a spaced relationship in a direction of rotation of the disc 12, a plurality (three in this embodiment) of inner-side torque bearing portions 24 projecting from the inner-side cylinder portion 21 towards the outer side of the disc, the inner-side torque bearing portions 24 being arranged in a spaced relationship in a direction of rotation of the disc 12, and a plurality (three in this embodiment) of disc pass portions 26, each connecting the outer-side torque bearing portion 23 and the inner-side torque bearing portion 24 corresponding to each other in terms of a position in the direction of rotation of the disc. That is, in the caliper body 16, the outer-side torque bearing portions 23 and the inner-side torque bearing portions 24 are provided between the outer-side cylinder portion 20 and the inner-side cylinder portion 21, and the disc pass portions 26 are provided between the outer-side torque bearing portions 23 and the inner-side torque bearing portions 24 and connect the outer-side torque bearing portions 23 and the inner-side torque bearing portions 24.

Therefore, in the caliper body 16, a plurality (three in this embodiment) of portions are arranged in a spaced relationship in a direction of rotation of the disc 12, each of which portions comprises the outer-side torque bearing portion 23, the disc pass portion 26 and the inner-side torque bearing portion 24 extending in an axial direction of the disc 12. A pad-mounting space 28 is formed between each pair of adjacent ones of these portions, which space 28 has an opening facing in a radial direction of the disc 12. There are provided a plurality (two in this embodiment) of pad-mounting spaces 28 arranged in a direction of rotation of the disc.

In the caliper body 16, opposed surfaces 20a and 21a of the outer-side and inner-side cylinder portions 20 and 21 face each other through each pad-mounting space 28. A pad pin 30 extends in an axial direction of the disc through the pad-mounting space 28 between the opposed surfaces 20a and 21a.

Bores 31 are formed in the opposed surfaces 20a and 21a of the outer-side and inner-side cylinder portions 20 and 21, which surfaces face each other through each pad-mounting space 28. Each bore 31 has a center axis parallel to an axial direction of the disc. The pistons 17 are fitted into inner-diameter portions 32 of the bores 31. Thus, a plurality of pairs (two pairs in this embodiment) of bores 31 are arranged in a direction of rotation of the disc, with the bores 31 of each pair facing each other in an axial direction of the disc. A plurality of pairs (two pairs in this embodiment) of pistons 17 are arranged in a direction of rotation of the disc, with the pistons 17 of each pair facing each other in an axial direction of the disc.

A pair of pads 33 are supported on each pad pin 30 of the caliper body 16. Thus, totally two pairs of pads 33 are provided in the caliper body 16. The pads 33 are adapted to slidably move in an axial direction of the disc. The pads 33 are respectively disposed on opposite sides of the disc 12 in an axial direction of the disc. The pistons 17, each of which is disposed on a side opposite to the disc 12 relative to the corresponding pad 33, are adapted to press the pads 33 against the disc 12, thus applying a braking force to the vehicle.

A braking torque during braking when the vehicle travels in a forward direction acts as a force which moves the pads 33 from an entrance side of the disc 12 in a direction of rotation of the disc (hereinafter, referred to simply as "the entrance side of the disc") to an exit side of the disc 12 in the direction of rotation of the disc (hereinafter, referred to simply as "the exit side of the disc"). This force is transmitted from the pair of pads 33 on the exit side of the disc to the caliper body 16 through the outer-side torque bearing portion 23 and the inner-side torque bearing portion 24 which are located most closely to the exit side of the disc and abut against these pads 33. The force is also transmitted from the pair of pads 33 on the entrance side of the disc to the caliper body 16 through the outer-side torque bearing portion 23 and the inner-side torque bearing portion 24 which are located at an intermediate position in a direction of rotation of the disc and abut against these pads 33. When the vehicle travels in a backward direction, a braking torque during braking is transmitted from the pads 33 to the caliper body 16 through the outer-side torque bearing portions 23 and the inner-side torque bearing portions 24 which abut against the pads 33 on a side opposite to those which abut against the pads 33 when the vehicle travels in a forward direction.

As shown in FIG. 2, an inner side (as viewed in a radial direction of the disc) of the disc pass portion 26 of the caliper body 16 includes a pass recess 34 in which the disc 12 is provided. The outer-side torque bearing portion 23 and the inner-side torque bearing portion 24 extend beyond the disc pass portion 26 inwardly in a radial direction of the disc, so as to enable the torque from the pads 33 disposed in an overlapping relation to the disc 12 in a radial direction of the disc to be received in a direction of rotation of the disc. That is, a wall thickness of the disc pass portion 26 in a radial direction of the disc is smaller than that of each of the outer-side torque bearing portion 23 and the inner-side torque bearing portion 24.

In the pad-mounting space 28, a pad spring 35 is disposed so as to bias the pads 33 inwardly in a radial direction of the disc.

Thus, the disc brake 1 comprises a pair of pads 33 disposed on opposite sides of the disc 12, a caliper body 16 disposed so as to extend over the disc 12, and pistons 17, each of which is slidably held on a side opposite to the disc 12 relative to the corresponding pad 33. A plurality of bores 31 are disposed in a spaced relationship in a direction of rotation of the disc. An inner-side torque bearing portion 24, a disc pass portion 26 and an outer-side torque bearing portion 23 are disposed between the bores 31 adjacent to each other in a direction of rotation of the disc.

The outer-side cylinder portion 20 of the caliper body 16 includes a plurality (two in this embodiment) of mounting bolt openings 37 for mounting of the caliper 11 on the mount portion 14 of the front fork 13. The mounting bolt openings 37 are formed in parallel to each other in the radial direction of the disc. The outer-side cylinder portion 20 of the caliper body 16 includes a pipe mount opening 38 for mounting of a brake pipe, which opening extends in an axial direction of the disc. The pipe mount opening 38 is formed at a position which corresponds to an upper position when the caliper body is mounted on the front fork 13 and which is located on the exit side of the disc during braking when the vehicle travels in a forward direction. A bleeder mounting opening 40 for mounting a bleeder plug 39 for release of air is vertically formed at an upper end position above the pipe mount opening 38. In addition, the outer-side cylinder portion 20 and the inner-side cylinder portion 21 of the caliper body 16 include pad pin holes 41 for mounting of the pad pins 30. The pad pin holes 41 extend in an axial direction of the disc.

In this embodiment, the outer-side cylinder portion 20, the inner-side cylinder portion 21, all the outer-side torque bearing portions 23, all the inner-side torque bearing portions 24 and all the disc pass portions 26 are cast into a one-piece member, which forms the caliper body 16.

Figure 4:
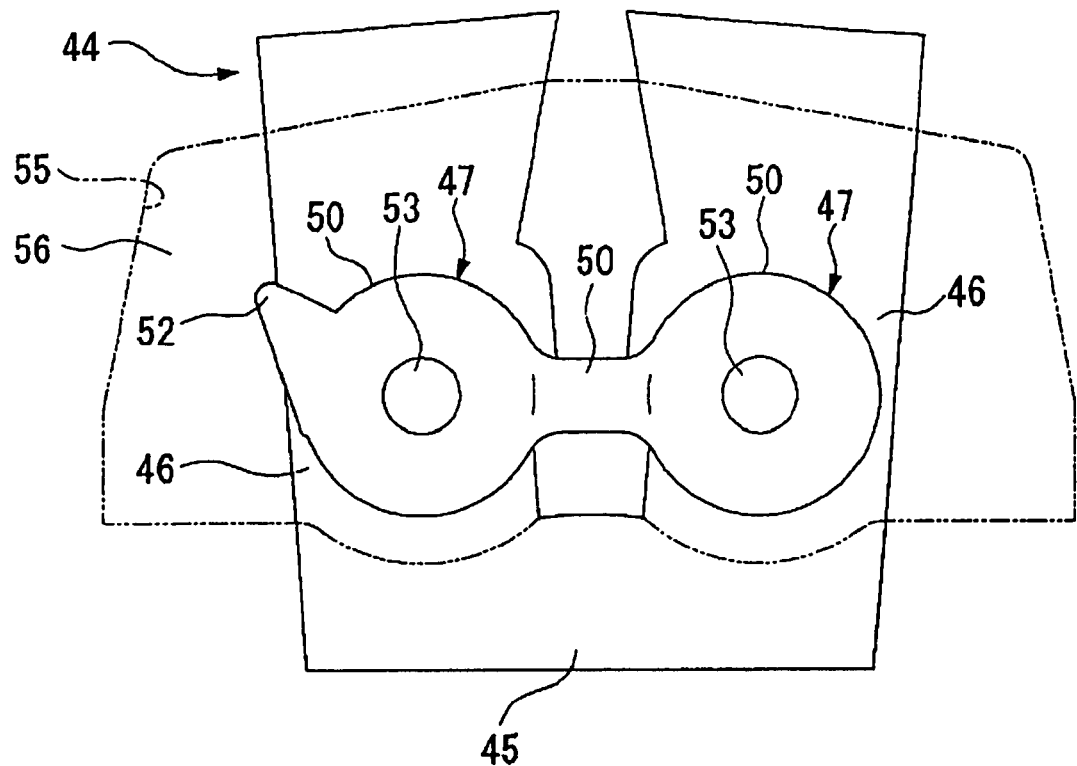
FIG. 4 is a front view showing a core for producing a caliper body in the disc brake according to the embodiment of the present invention.
Figure 5:
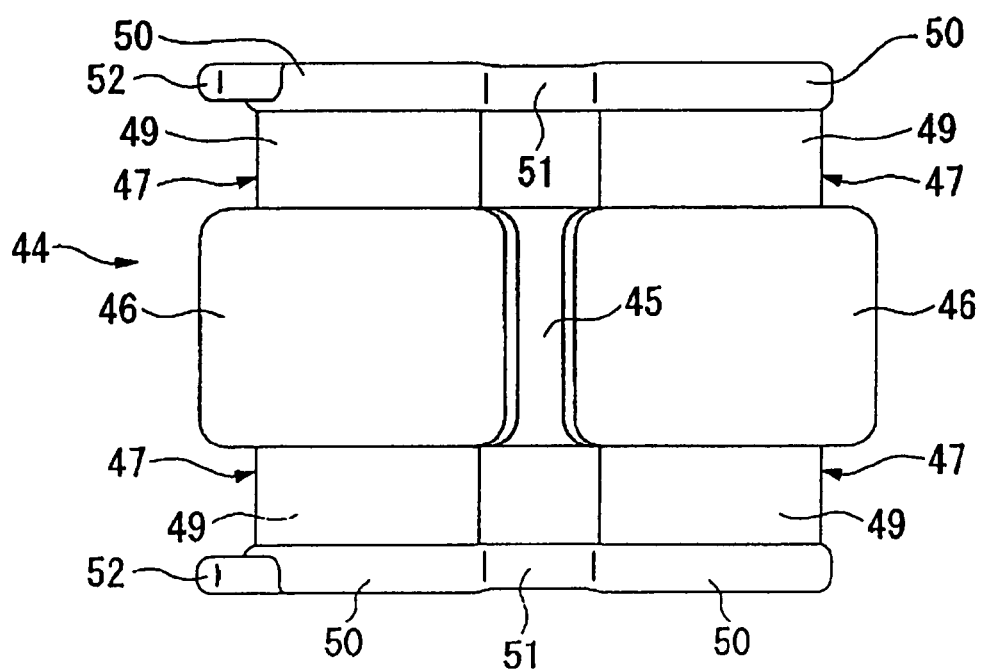
FIG. 5 is a plan view showing the core for producing the caliper body in the disc brake according to the embodiment of the present invention.
Figure 6:
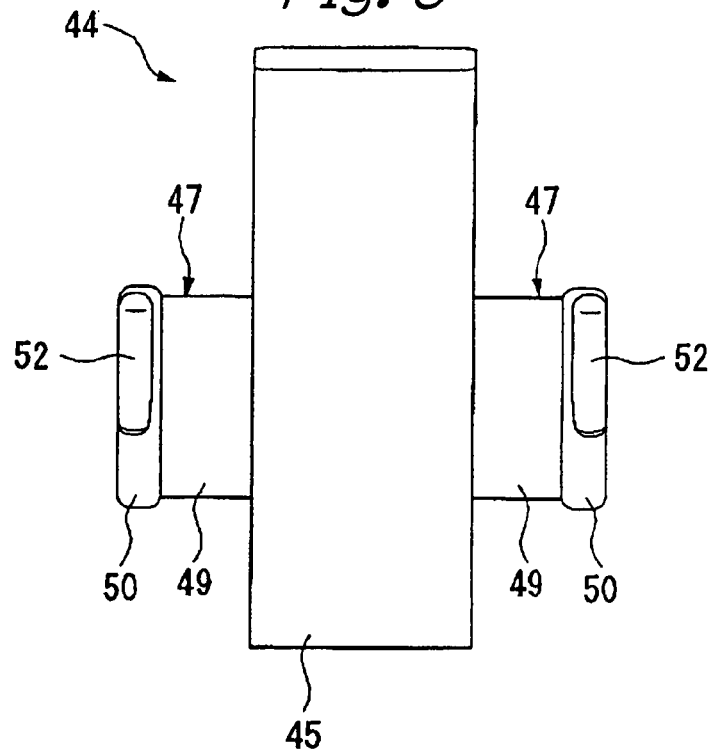
FIG. 6 is a left side view showing the core for producing the caliper body in the disc brake according to the embodiment of the present invention.

For casting, a core 44 shown in FIGS. 4 to 6 is used. In this embodiment, as the core 44, use is made of a shell core of resin-coated sand (quartz sand) consolidated by means of heat. The core 44 comprises a base portion 45, a plurality (two in this embodiment) of pad-mounting space forming portions 46 extending from the base portion 45 in the same direction while being spaced from each other, and a plurality (four in this embodiment) of prepared hole forming portions 47 extending in opposite directions beyond the pad-mounting space forming portions 46 so as to orthogonally intersect the direction of array of the pad-mounting-space forming portions 46. Each prepared hole forming portion 47 comprises an inner-diameter prepared hole forming portion 49 having a solid cylindrical body and an inmost recess forming portion 50 in a disc-like form, the inmost recess forming portion 50 being formed in the inner-diameter prepared hole forming portion 49 on a side opposite to the pad-mounting space forming portion 46 in a coaxial relationship to the inner-diameter prepared hole forming portion 49. The inmost recess forming portion 50 has a larger diameter than the inner-diameter prepared hole forming portion 49 and also has a larger diameter than the inner-diameter portion 32 of the bore 31 after machining of an inner surface of a prepared hole.

The core 44 comprises communication passage forming portions 51, each connecting proximately opposed portions of the adjacent inmost recess forming portions 50 arranged on the same side of the core 44, recess forming portions 52 extending from the inmost recess forming portions 50 disposed on opposite sides of one pad-mounting space forming portion 46. Each recess forming portion 52 extends from the corresponding inmost recess forming portion 50 on a side opposite to the communication passage forming portion 51 outwardly as viewed in a radial direction of the inmost recess forming portion 50. The recess forming portion 52 has a substantially tapered triangular form projecting from the inmost recess forming portion 50 while being inclined relative to the radial direction of the prepared hole forming portion 47, and has a non-circular form. In other words, the recess forming portion 52 is configured, such that it does not extend along the circumference of the inmost recess forming portion 50 in a coaxial relationship to the inmost recess forming portion 50, but extends outwardly from a circumferential part of the inmost recess forming portion 50. A projection forming portion 53 in the form of a recess is formed at a central portion of a surface of the inmost recess forming portion 50 on a side opposite to the inner-diameter prepared hole forming portion 49.

The core 44 is provided in a mold 55 indicated by a two-dot chain line in FIG. 4. Then, for example, an aluminum alloy in molten state is charged into a cavity 56 formed by the mold 55 and the core 44. In the cavity 56, the pad-mounting space forming portions 46 are fully spaced apart from each other. After charging, the mold is disassembled, and the core 44 is removed. As a result, a caliper body casting 16A shown in FIGS. 7 to 15 is obtained.

Figure 7:
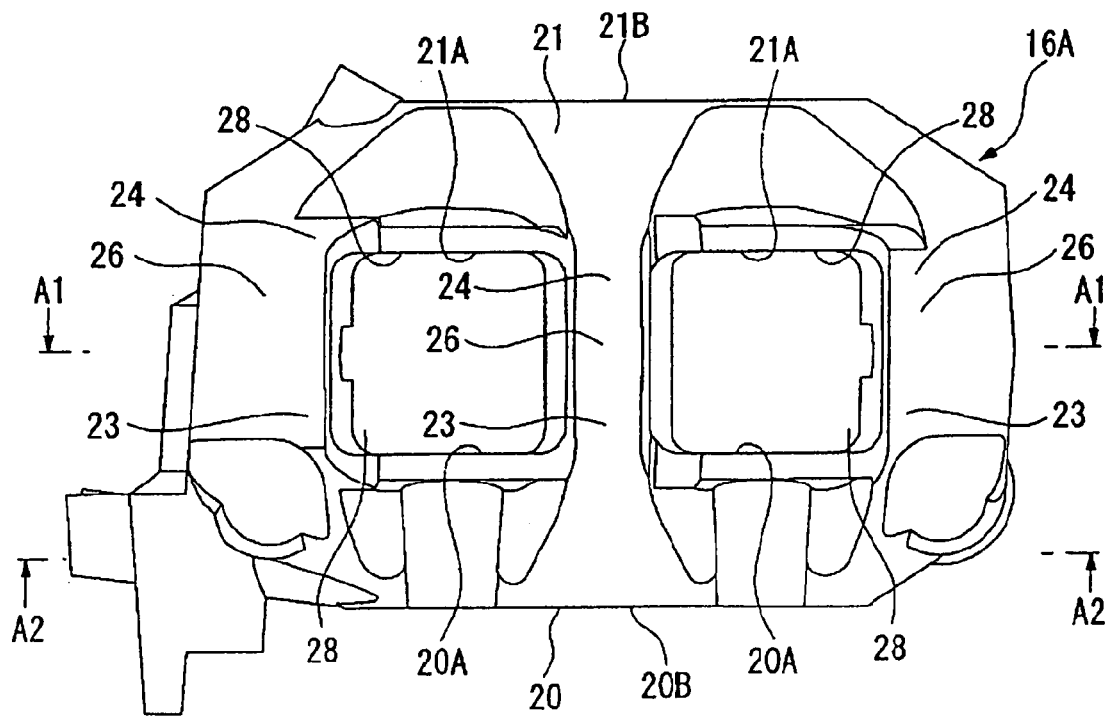
FIG. 7 is a plan view of a casting of the caliper body in the disc brake according to the embodiment of the present invention.
Figure 8:
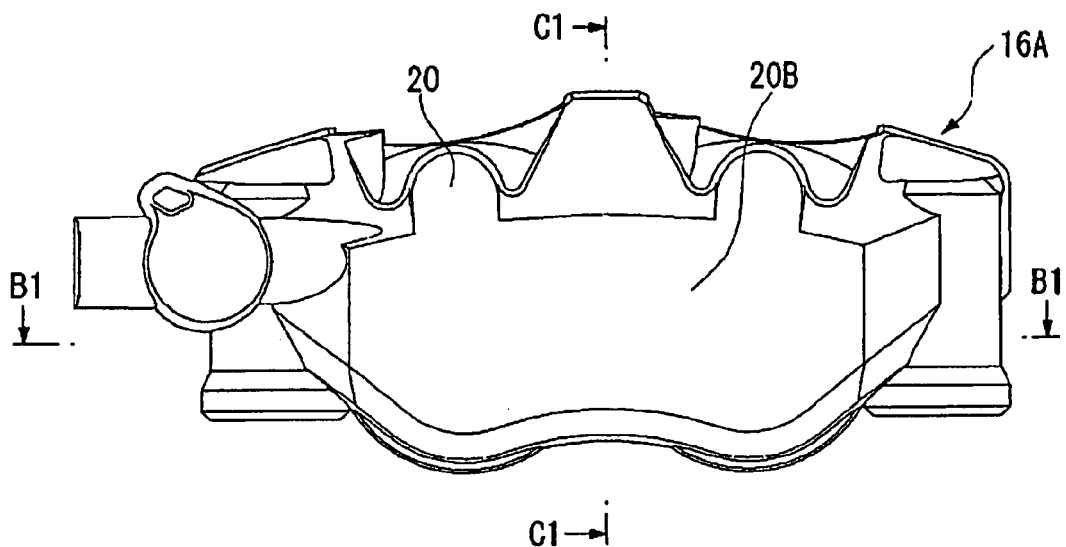
FIG. 8 is a front view of the casting of the caliper body in the disc brake according to the embodiment of the present invention.
Figure 9:
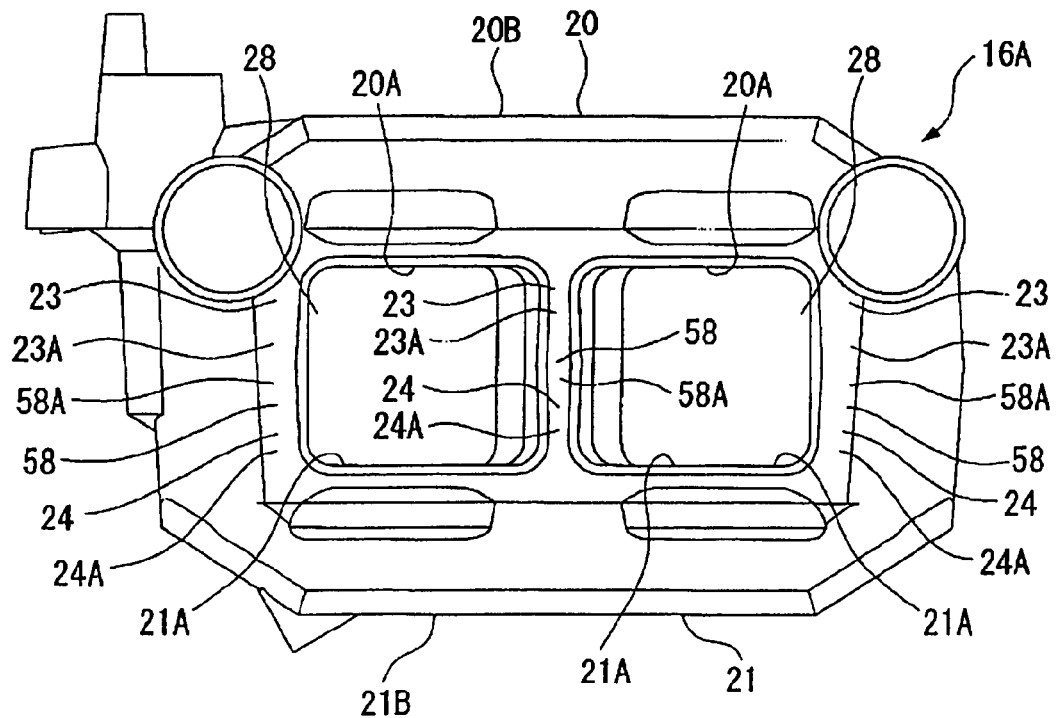
FIG. 9 is a bottom view of the casting of the caliper body in the disc brake according to the embodiment of the present invention.
Figure 10:
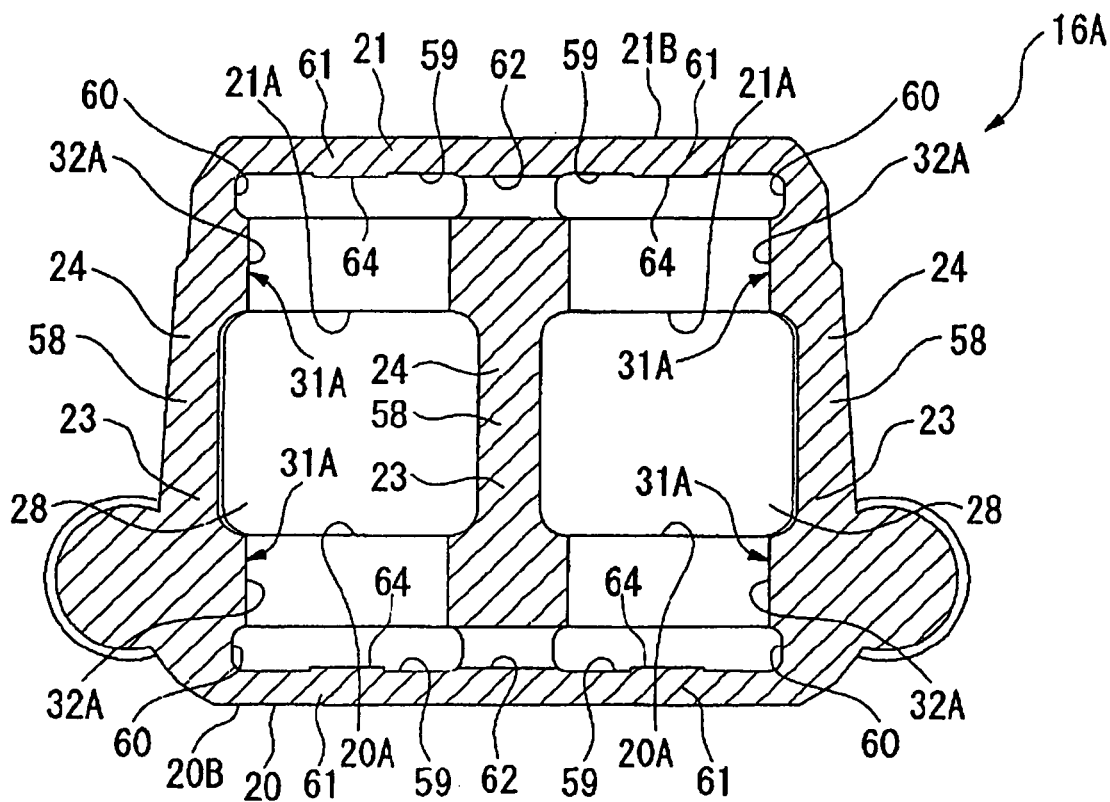
FIG. 10 is a cross-sectional view of the casting of the caliper body in the disc brake according to the embodiment of the present invention, taken along the line B1-B1 in FIG. 8.
Figure 11:
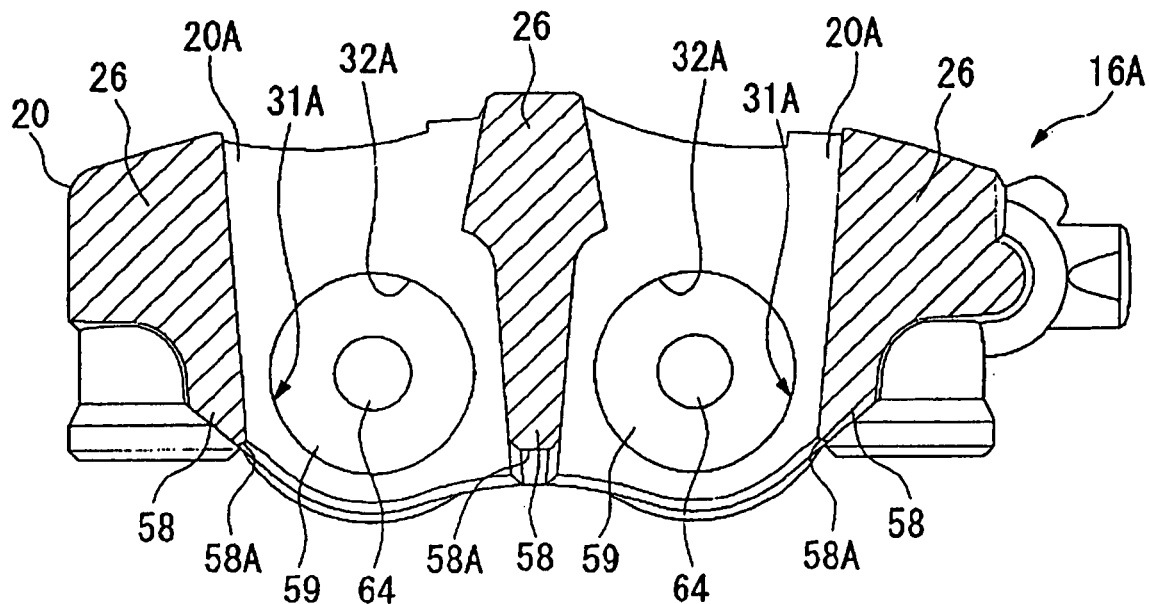
FIG. 11 is a cross-sectional view of the casting of the caliper body in the disc brake according to the embodiment of the present invention, taken along the line A1-A1 in FIG. 7.
Figure 13:
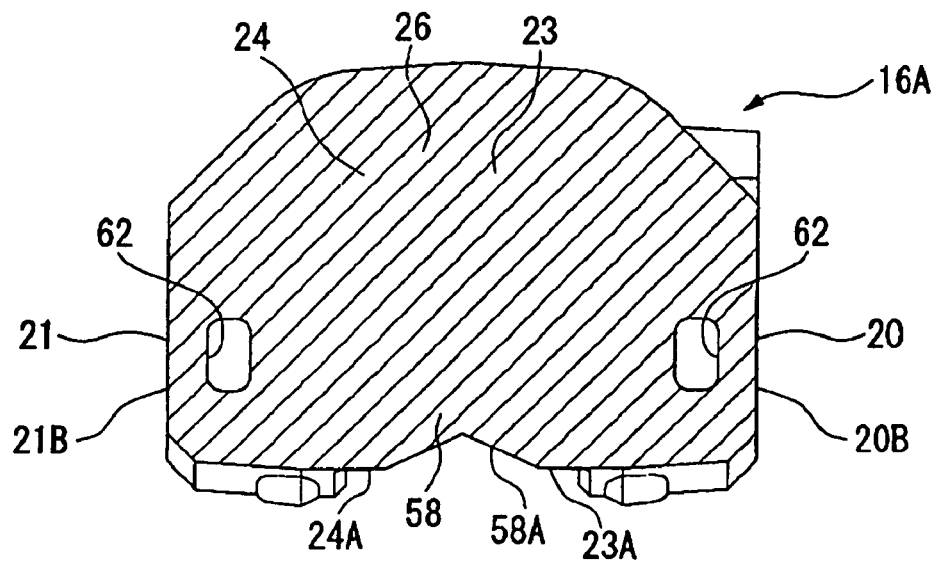
FIG. 13 is a cross-sectional view of the casting of the caliper body in the disc brake according to the embodiment of the present invention, taken along the line C1-C1 in FIG. 8.
Figure 14:
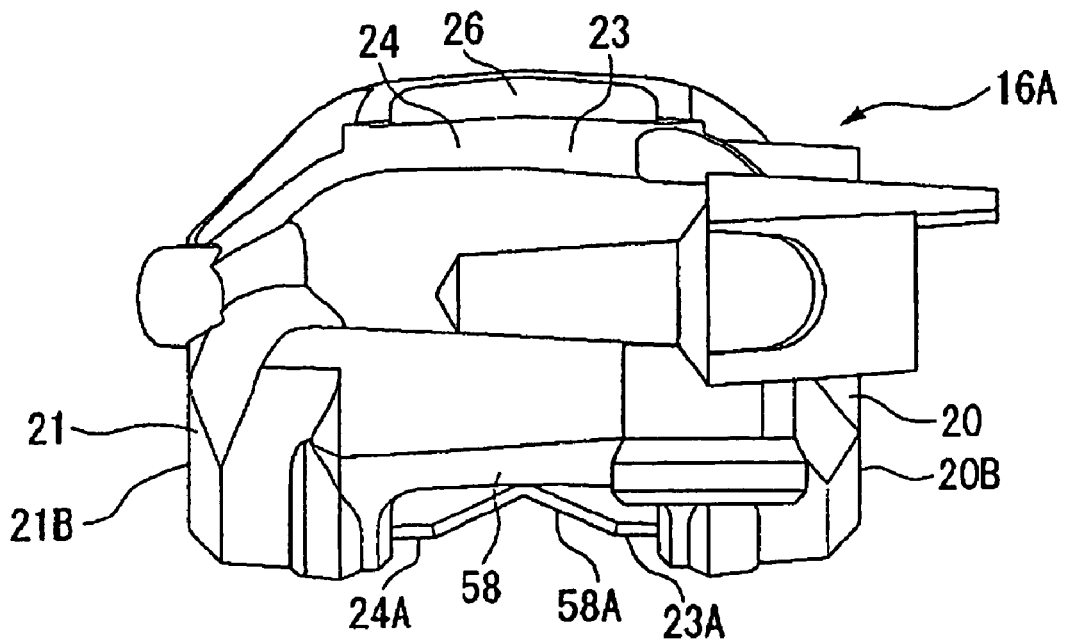
FIG. 14 is a left side view of the casting of the caliper body in the disc brake according to the embodiment of the present invention.
Figure 15:
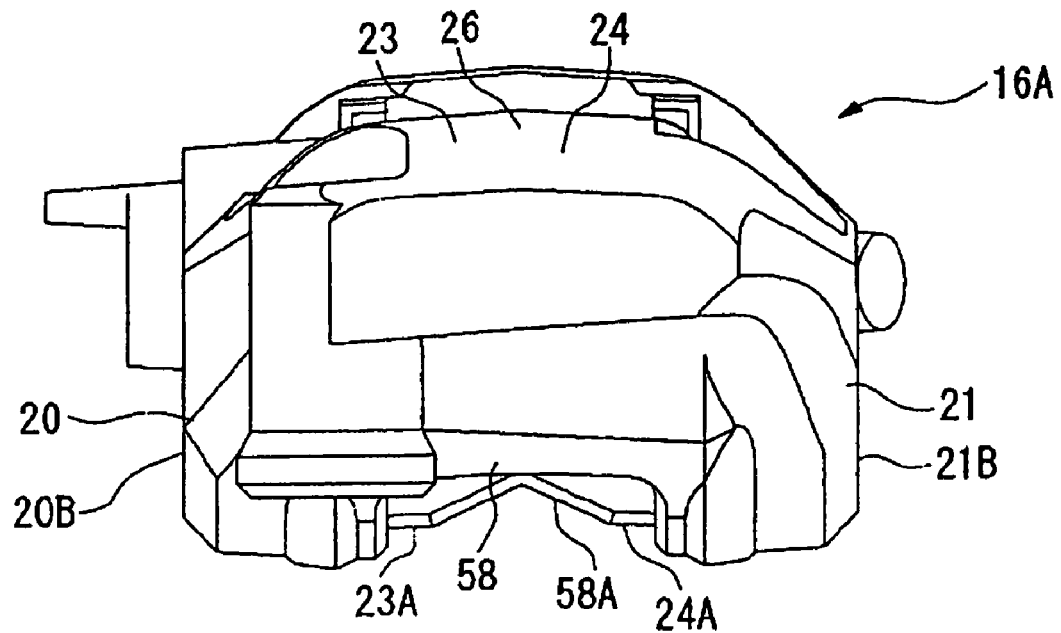
FIG. 15 is a right side view of the casting of the caliper body in the disc brake according to the embodiment of the present invention.
Figure 16:
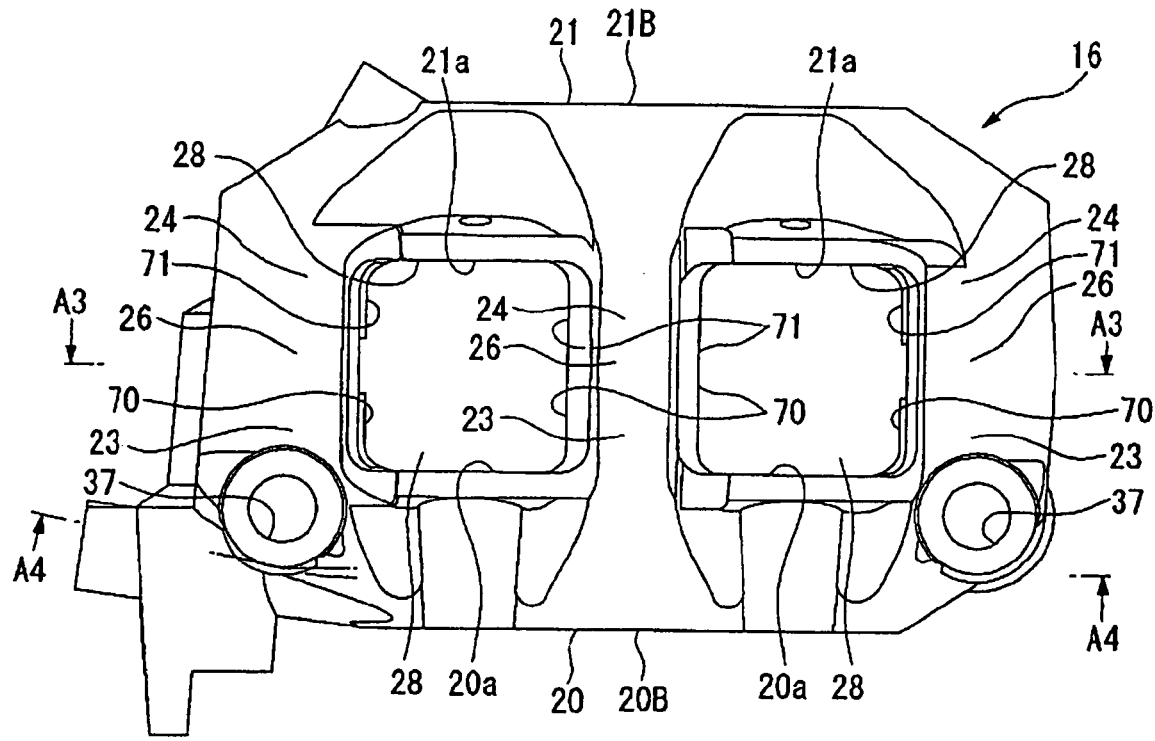
FIG. 16 is a plan view of the caliper body in the disc brake according to the embodiment of the present invention.
Figure 17:
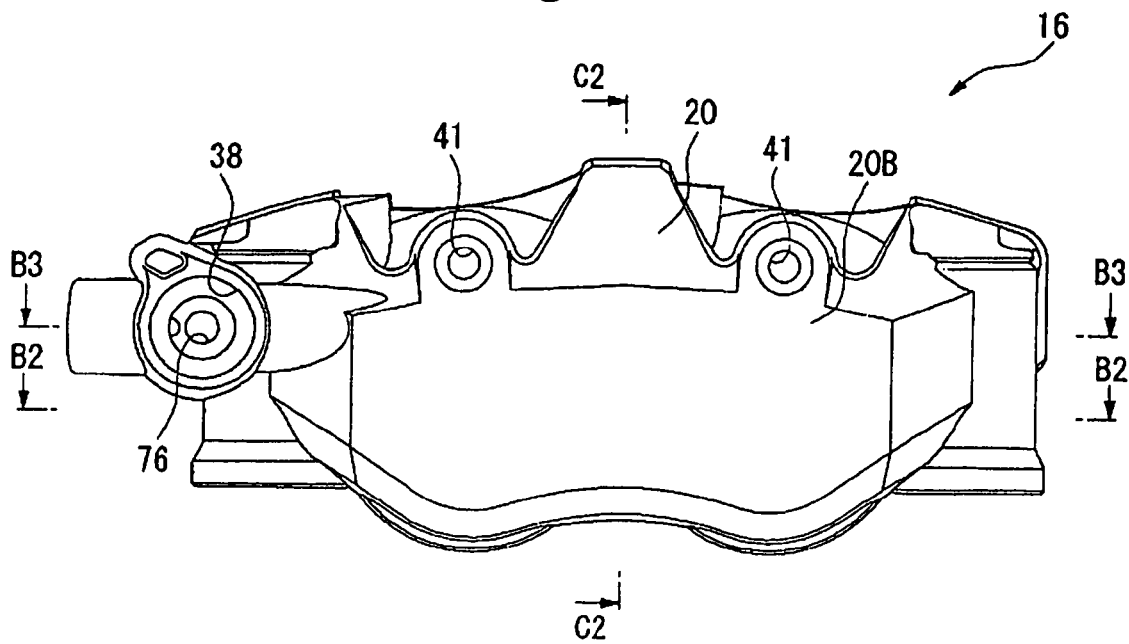
FIG. 17 is a front view of the caliper body in the disc brake according to the embodiment of the present invention.
Figure 18:
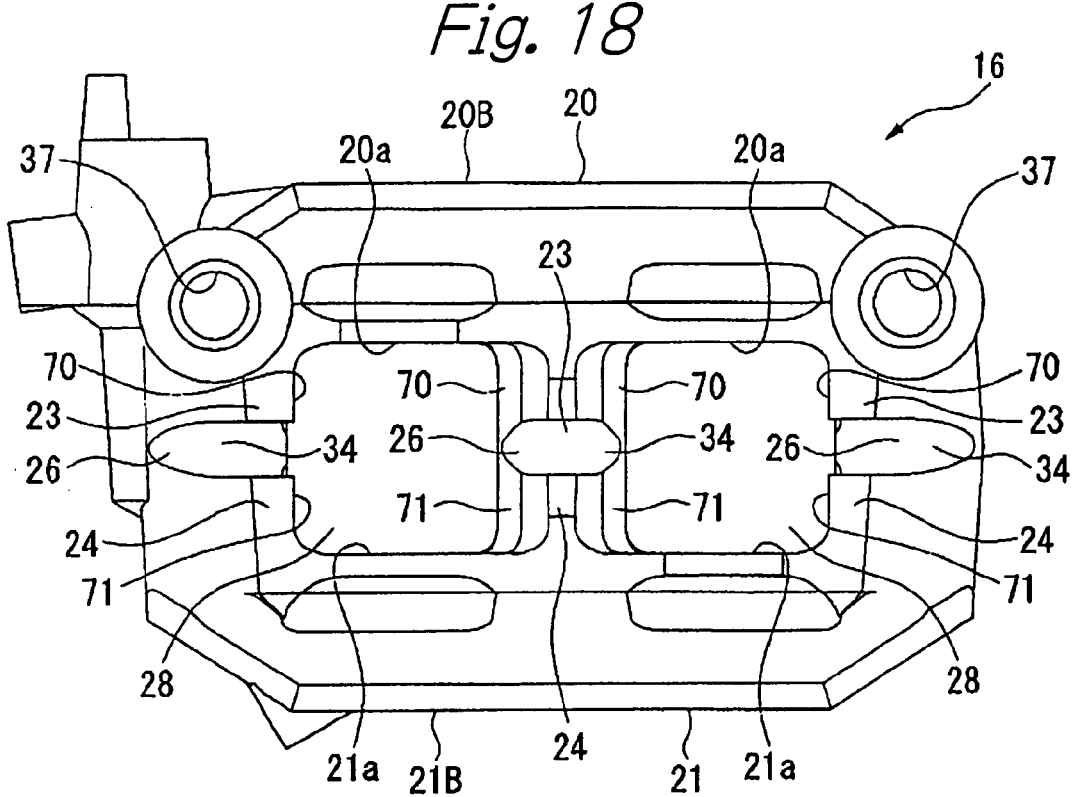
FIG. 18 is a bottom view of the caliper body in the disc brake according to the embodiment of the present invention.

In the casting 16A of the caliper body 16, as shown in FIGS. 7, 9 and 10, the outer-side cylinder portion 20 and the inner-side cylinder portion 21 facing each other are formed by means of the mold 55 and the two pad-mounting space forming portions 46 of the core 44. The three outer-side torque bearing portions 23 respectively project from the outer-side cylinder portion 20 towards the inner side of the disc while being spaced from each other in a direction of rotation of the disc. The three inner-side torque bearing portions 24 respectively project from the inner-side cylinder portion 21 towards the outer side of the disc while being spaced from each other in a direction of rotation of the disc. The three disc pass portions 26 are formed, each of which connects outer sides (in a radial direction of the disc) of the outer-side torque bearing portion 23 and the inner-side torque bearing portion 24 arranged in an axial direction of the disc. At this time, the casting 16A also includes three interpositions 58 each connecting, on an inner side of the disc pass portion 26 (as viewed in a radial direction of the disc), the outer-side torque bearing portion 23 and the inner-side torque bearing portion 24 arranged in an axial direction of the disc, and thus the two pad-mounting spaces 28 are formed at two positions between the outer-side cylinder portion 20 and the inner-side cylinder portion 21. As indicated in FIG. 11, the disc pass portion 26 and the interposition 58 corresponding to each other in terms of a position in a direction of rotation of the disc are formed as one piece in a radial direction of the disc. As indicated in FIGS. 13 to 15, a surface 58A of the interposition 58 on an inner side thereof in a radial direction of the disc, and a surface 23A of the outer-side torque bearing portion 23 and a surface 24A of the inner-side torque bearing portion 24, are connected without being stepped.

The two pad-mounting spaces 28 are formed by means of two pad-mounting space forming portions 46 of the core 44. As shown in FIGS. 10 and 11, the outer-side cylinder portion 20 of the casting 16A of the caliper body 16 includes prepared holes 31A, which are formed by means of the prepared hole forming portions 47 projecting from the pad-mounting space forming portions 46 of the core 44. Specifically, two prepared holes 31A are formed, each of which is formed between the adjacent outer-side torque bearing portions 23 of the outer-side cylinder portion 20. Each of the prepared holes 31A is formed in a surface 20A facing the inner-side cylinder portion 21, so as to have a predetermined depth.

That is, in the outer-side cylinder portion 20, an inner-diameter prepared hole portion 32A of the prepared hole 31A having a cylindrical surface is formed by means of the inner-diameter prepared hole forming portion 49 of the core 44. Further, by means of the inmost recess forming portion 50 of the core 44, an inmost recess portion 60 of the prepared hole 31A, which has a larger diameter than the inner-diameter prepared hole portion 32A and also has a larger diameter than the inner-diameter portion 32 of the bore 31 after machining, is formed at an end of the inner-diameter prepared hole portion 32A on a side of a bottom portion 61 in a coaxial relationship with the inner-diameter prepared hole portion 32A.

Further, in the outer-side cylinder portion 20, a bottom surface 59 forming the inmost recess portion 60 of each prepared hole 31A includes a projection 64 slightly projecting therefrom in an axial direction. The projection 64 is formed by means of the projection forming portion 53 of the core 44 during casting.

Figure 12:
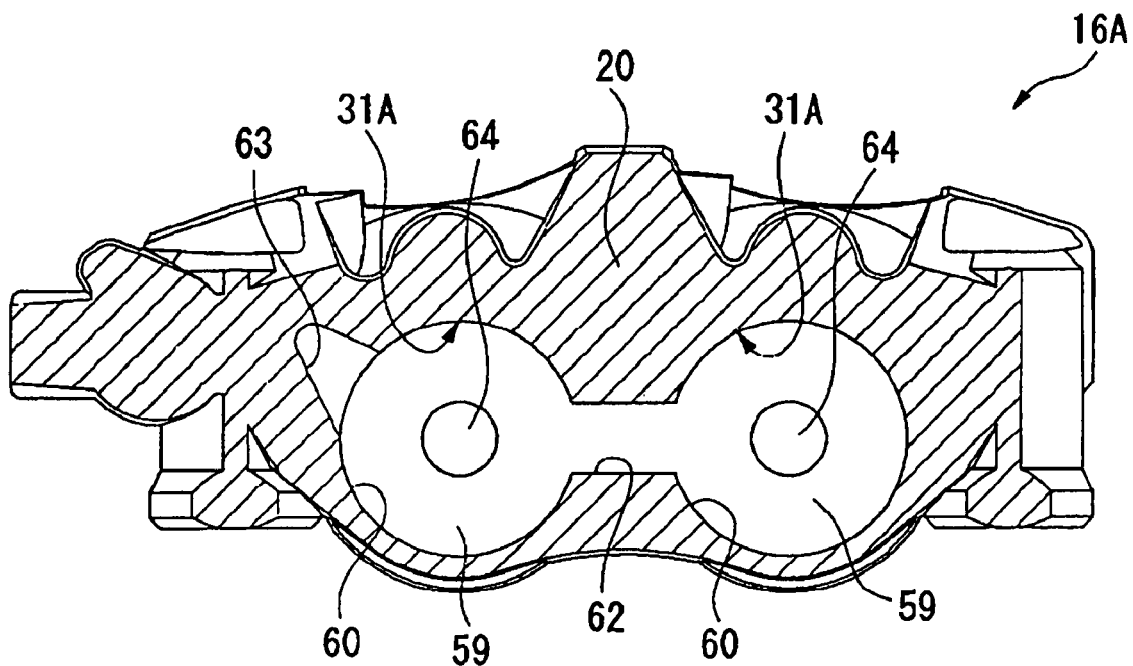
FIG. 12 is a cross-sectional view of the casting of the caliper body in the disc brake according to the embodiment of the present invention, taken along the line A2-A2 in FIG. 7.

Further, in the outer-side cylinder portion 20, proximately opposed portions of the inmost recess portions 60 disposed adjacent to each other in a direction of rotation of the disc are communicated with each other through a communication passage 62, which is formed by means of the communication passage forming portion 51 of the core 44 during casting. As shown in FIG. 12, a recess 63 is formed at the inmost recess portion 60 (i.e., the bottom portion 61 of the prepared hole 31A) on the exit side of the disc during braking when the vehicle travels in a forward direction. The recess 63 is located on a side opposite to the communication passage 62 relative to the inmost recess portion 60. The recess 63 is formed by means of the recess forming portion 52 of the core 44, and has a non-circular form. Specifically, the recess 63 has a substantially tapered triangular form extending outwardly in a radial direction of the prepared hole 31A while being inclined relative to the radial direction of the prepared hole 31A. The recess 63 extends from the inmost recess portion 60 outwardly in a radial direction of the disc. In other words, a distal end of the recess is located outwardly from a region occupied by the corresponding inmost recess portion as viewed in a direction of rotation of the disc, while being located radially outwardly from the center axis of the corresponding bore as viewed in a radial direction of the disc. Further, a proximal end of the recess 63, which is located on a side of the inmost recess portion 60, extends to a position corresponding to the center axis of the prepared hole 31A or a position located inwardly from the center axis of the prepared hole 31A as viewed in the radial direction of the disc 12. By this arrangement, air is prevented from being accumulated between the inmost recess portion 60 and the proximal end of the recess 63. Specifically, the proximal end of the recess extends, outwardly in a radial direction of the disc along the circumference of the inmost recess portion, from a position corresponding to the center axis of the corresponding bore or a position located inwardly from the center axis of the corresponding bore as viewed in a radial direction of the disc. By this arrangement, when the caliper body 16 is mounted in vertical position as shown in FIG. 1, with the recess 63 being located at the top of the inmost recess portion, it is possible to avoid air being trapped in an uppermost portion of a circumferential wall surface of the inmost recess portion.

Similarly, the inner-side cylinder portion 21 of the casting 16A of the caliper body 16 includes prepared holes 31A, which are formed by means of the prepared hole forming portions 47 projecting from the pad-mounting space forming portions 46 of the core 44. Specifically, two prepared holes 31A are formed, each of which is formed between the adjacent inner-side torque bearing portions 24 of the inner-side cylinder portion 21. Each of the prepared holes 31A is formed in a surface 21A facing the outer-side cylinder portion 20 so as to have a predetermined depth.

That is, in the inner-side cylinder portion 21, the inner-diameter prepared hole portion 32A of the prepared hole 31A having a cylindrical surface is formed by means of the inner-diameter prepared hole forming portion 49 of the core 44. Further, by means of the inmost recess forming portion 50 of the core 44, the inmost recess portion 60, which has a larger diameter than the inner-diameter prepared hole portion 32A and also has a larger diameter than the inner-diameter portion 32 of the bore 31 after machining, is formed at an end of the inner-diameter prepared hole portion 32A on a side of the bottom portion 61 in a coaxial relationship with the inner-diameter prepared hole portion 32A.

In the inner-side cylinder portion 21, the bottom surface 59 forming the inmost recess portion 60 of each prepared hole 31A includes the projection 64 slightly projecting therefrom in an axial direction. The projection 64 is formed by means of the projection forming portion 53 of the core 44 during casting.

Further, in the inner-side cylinder portion 21, proximately opposed portions of the inmost recess portions 60 disposed adjacent to each other in the direction of rotation of the disc are communicated with each other through the communication passage 62, which is formed by means of the communication passage forming portion 51 of the core 44 during casting. By means of the recess forming portion 52 of the core 44, the recess 63 is formed at the inmost recess portion 60 on the exit side of the disc during braking when the vehicle travels in a forward direction. The recess 63 is located on a side opposite to the communication passage 62 relative to the inmost recess portion 60. The recess 63 has a non-circular form. Specifically, the recess 63 has a substantially tapered triangular form extending from the inmost recess portion 60 outwardly in a radial direction of the prepared hole 31A. The proximal end of the recess 63, which is located on a side of the inmost recess portion 60, extends to a position corresponding to the center axis of the prepared hole 31A or a position located inwardly from the center axis of the prepared hole 31A as viewed in the radial direction of the disc 12. By this arrangement, air is prevented from being accumulated between the inmost recess portion 60 and the proximal end of the recess 63.

The recess 63 of the outer-side cylinder portion 20 and the recess 63 of the inner-side cylinder portion 21 correspond to each other in terms of a position in the direction of rotation and in the radial direction of the disc.

Thus, in the casting 16A of the caliper body 16, prepared holes 31A, which are machined into the bores 31, are arranged at a plurality (two in this embodiment) of positions in a spaced relationship in the direction of rotation of the disc 12. The inner-side torque bearing portion 24, the outer-side torque bearing portion 23, the disc pass portion 26 and the interposition 58 are formed as a one-piece member by casting between the prepared holes 31A adjacent to each other in the direction of rotation of the disc.

Further, in the casting 16A of the caliper body 16, the recess 63 is formed at a position corresponding to the top of the uppermost prepared hole 31A (the prepared hole 31A located on the exit side of the disc during braking when the vehicle travels in a forward direction) when the caliper body is mounted on the vehicle body.

When the bores 31 are formed at three or more positions in a spaced relationship in the direction of rotation of the disc, the number of the pad-mounting spaces 28 and the number of the prepared holes 31A facing the pad-mounting spaces 28 are increased according to the number of bores 31, and the communication passage 62 is provided at each of the positions between the prepared holes 31A arranged in the direction of rotation of the disc. In this case, the inner-side torque bearing portion 24, the outer-side torque bearing portion 23, the disc pass portion 26 and the interposition 58, which are formed into one piece by casting, are also provided at each of the positions between the prepared holes 31A arranged in a direction of rotation of the disc. In this case, the recess 63 is formed at the inmost recess portion 60 on a side opposite to the communication passage 62, the inmost recess portion 60 being located most closely to the exit side of the disc during braking when the vehicle travels in a forward direction and also located at an uppermost position when the caliper body is mounted.

The casting 16A is machined in a manner such as mentioned below, to thereby obtain the caliper body 16 shown in FIGS. 16 to 26.

An outer surface 20B of the outer-side cylinder portion 20 on a side opposite to the disc 12 and an outer surface 21B of the inner-side cylinder portion 21 on a side opposite to the disc 12 are clamped by means of a machining apparatus. In this instance, the interposition 58 formed on an inner side of the disc pass portion 26 in a radial direction of the disc 12 makes an intermediate portion between the outer-side torque bearing portion 23 and the inner-side torque bearing portion 24 have the same wall thickness as the outer-side torque bearing portion 23 and the inner-side torque bearing portion 24 in a radial direction of the disc 12. Further, the outer-side torque bearing portion 23, the inner-side torque bearing portion 24, the disc pass portion 26 and the interposition 58 are provided between the prepared holes 31A adjacent to each other in a direction of rotation of the disc, in addition to those provided on opposite ends of the outer-side cylinder portion 20 and the inner-side cylinder portion 21 in a direction of rotation of the disc. Therefore, deformation of the casting 16A due to application of clamping force can be prevented.

Figure 19:
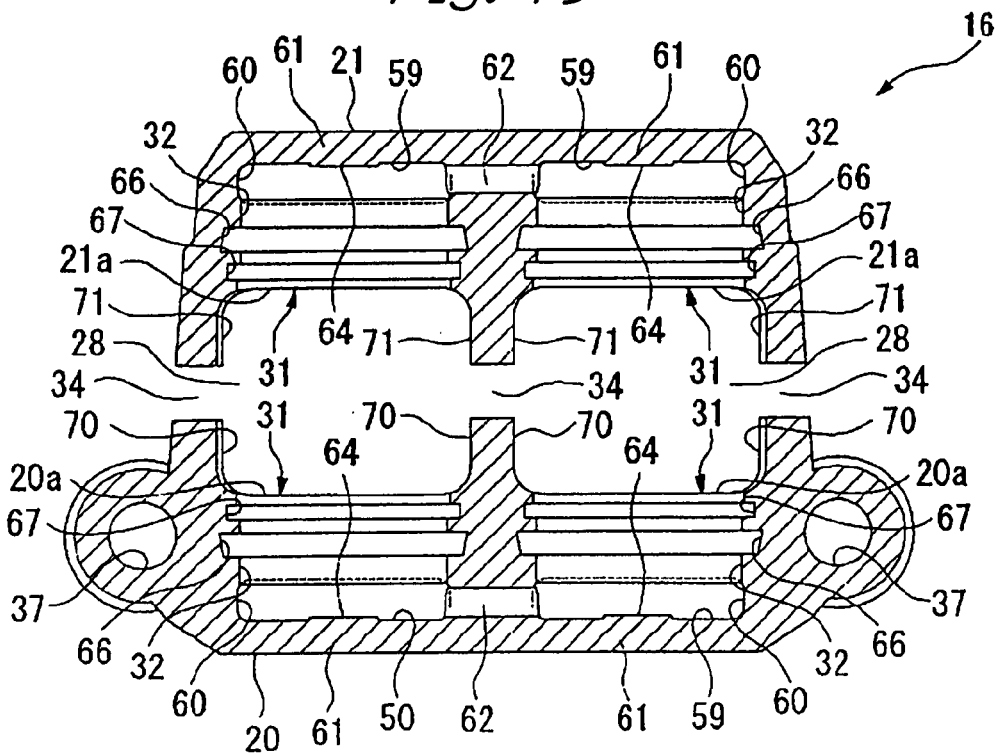
FIG. 19 is a cross-sectional view of the caliper body in the disc brake according to the embodiment of the present invention, taken along the line B2-B2 in FIG. 17.
Figure 21:
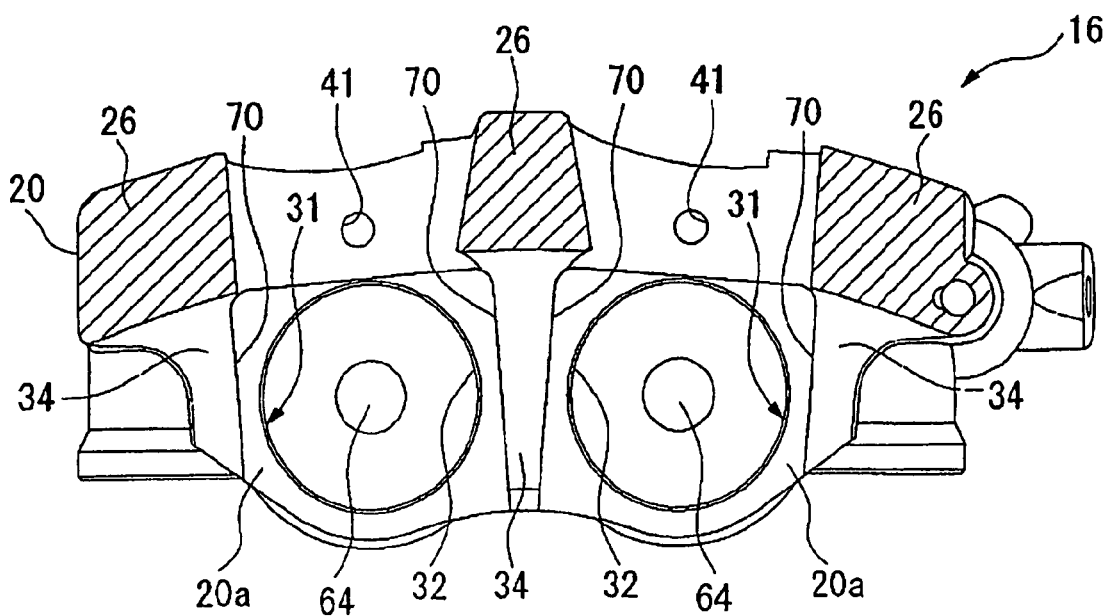
FIG. 21 is a cross-sectional view of the caliper body in the disc brake according to the embodiment of the present invention, taken along the line A3-A3 in FIG. 16.

Then, a tool is inserted from each pad-mounting space 28 between the outer-side cylinder portion 20 and the inner-side cylinder portion 21 into the casting 16A clamped by the machining apparatus. Then, as shown in FIGS. 19 and 21, a cutting operation is conducted with respect to only the inner-diameter prepared hole portion 32A of the prepared hole 31A formed in each of the outer-side cylinder portion 20 and the inner-side cylinder portion 21 and facing the pad-mounting space 28, and the inner-diameter prepared hole portion 32A is formed into the inner-diameter portion 32 by boring (see the inner-diameter prepared hole portion 32A before boring and the inner-diameter portion 32 obtained after boring shown in FIG. 26). Two seal grooves 66 and 67 are also formed in the inner-diameter portion 32 by a milling operation. Thus, each of the bores 31 formed comprises the inner-diameter portion 32 and the seal grooves 66 and 67, which are formed by machining, and the inmost recess portion 60 which is unmachined after casting. For assembly, the piston 17 is fitted into the inner-diameter portion 32 of each bore 31, with seal rings (not shown) being fittingly disposed in the seal grooves 66 and 67. Thus, each of the bores 31 is formed by machining from a portion on a side of the pad-mounting space 28 between the inner-side cylinder portion 21 and the outer-side cylinder portion 20. Therefore, the bottom portions 61 of all the bores 31 are maintained in a closed state obtained by casting. The projection 64 of the inmost recess portion 60 enables the piston 17 and the bottom surface 59 to be always spaced apart from each other, even when the piston 17 abuts against the projection 64.

Further, a tool is inserted from each pad-mounting space 28 between the outer-side cylinder portion 20 and the inner-side cylinder portion 21 and the surfaces of the outer-side torque bearing portion 23 and the surfaces of the inner-side torque bearing portion 24 facing the pad-mounting space 28 are cut by milling, to thereby form outer-side torque bearing surfaces 70 and inner-side torque bearing surfaces 71 shown in FIGS. 16, 18, 19 and 21. The outer-side torque bearing surfaces 70 and inner-side torque bearing surfaces 71 are adapted to abut against the end surfaces of the pads 33 in a direction of rotation of the disc 12, to thereby receive a torque from the pads 33.

Then, a tool is inserted from each pad-mounting space 28 between the outer-side cylinder portion 20 and the inner-side cylinder portion 21, and the outer-side surface 20a and the inner-side surface 21a facing each other are formed by milling.

The mounting bolt openings 37 shown in FIGS. 16 and 18 to 20 for insertion of mounting bolts into the mount portion 14 of the front fork 13 are formed by boring in the outer-side cylinder portion 20 at two positions spaced apart from each other in a direction of rotation of the disc 12. The mounting bolt openings 37 orthogonally intersect an axial direction of the disc and extend through the outer-side cylinder portion 20 in parallel to each other. The pad pin holes 41 extending in an axial direction of the disc 12 are also formed by boring.

Figure 20:
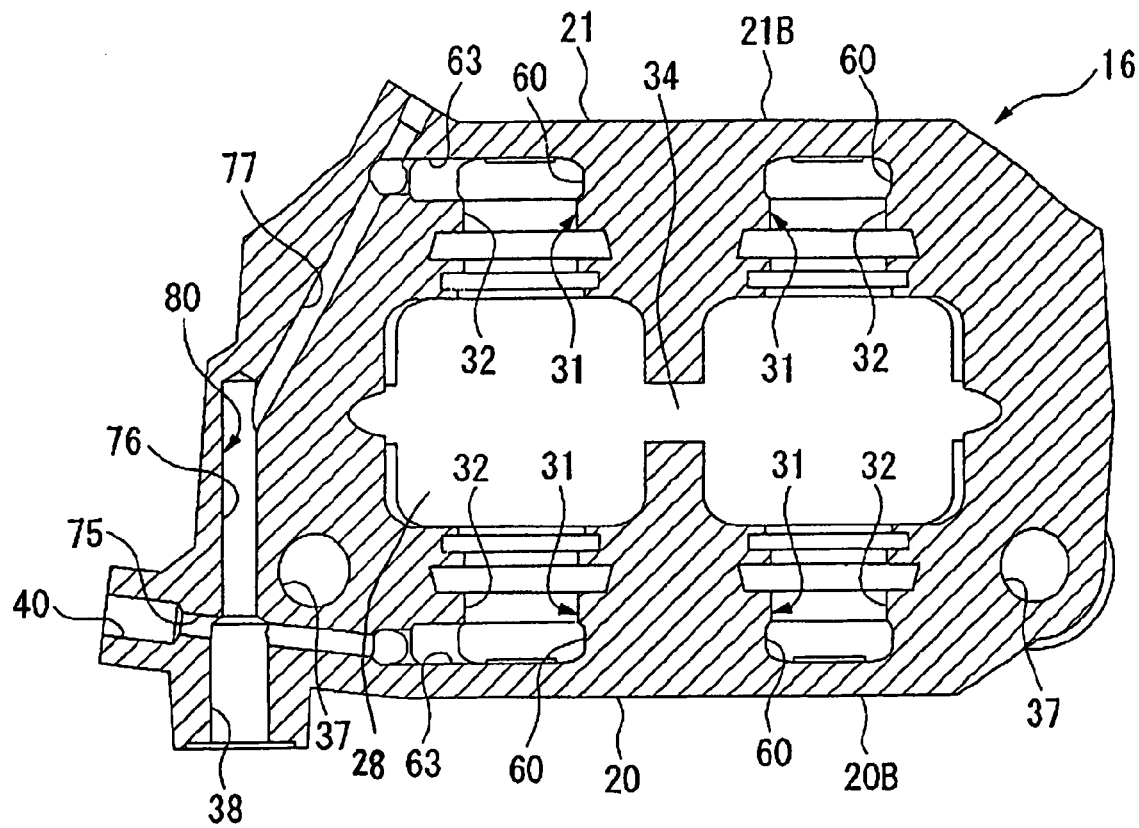
FIG. 20 is a cross-sectional view of the caliper body in the disc brake according to the embodiment of the present invention, taken along the line B3-B3 in FIG. 17.
Figure 22:
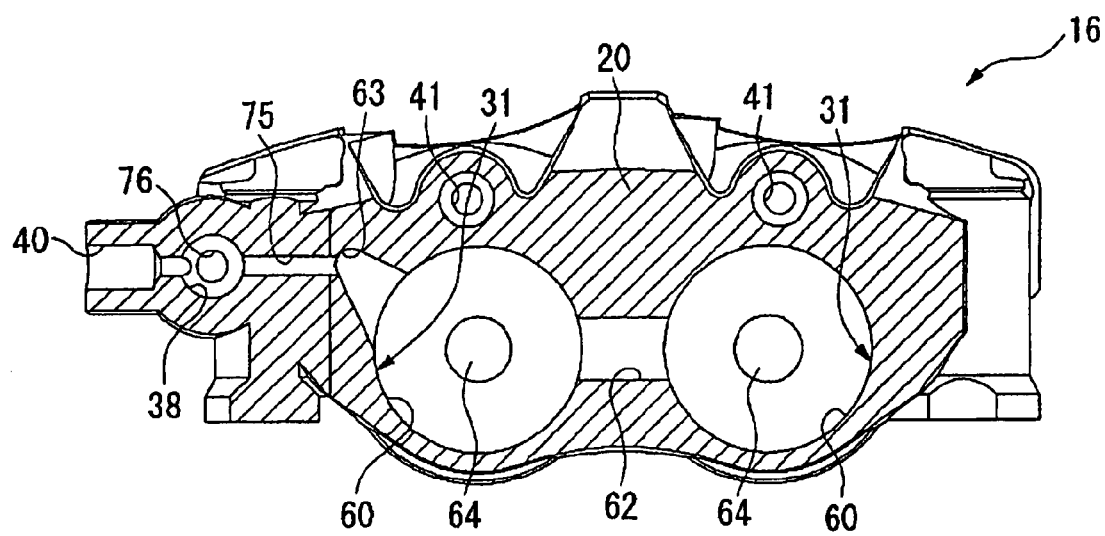
FIG. 22 is a cross-sectional view of the caliper body in the disc brake according to the embodiment of the present invention, taken along the line A4-A4 in FIG. 16.
Figure 23:
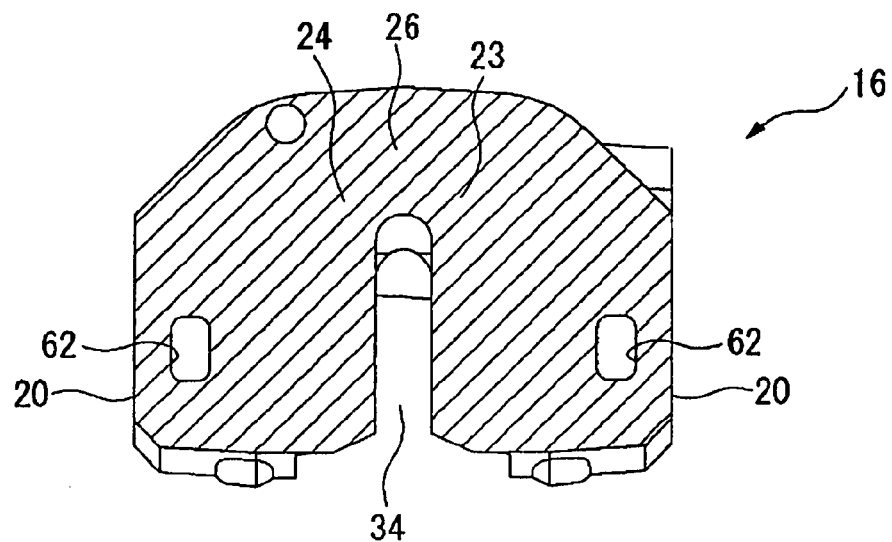
FIG. 23 is a cross-sectional view of the caliper body in the disc brake according to the embodiment of the present invention, taken along the line C2-C2 in FIG. 17.
Figure 24:
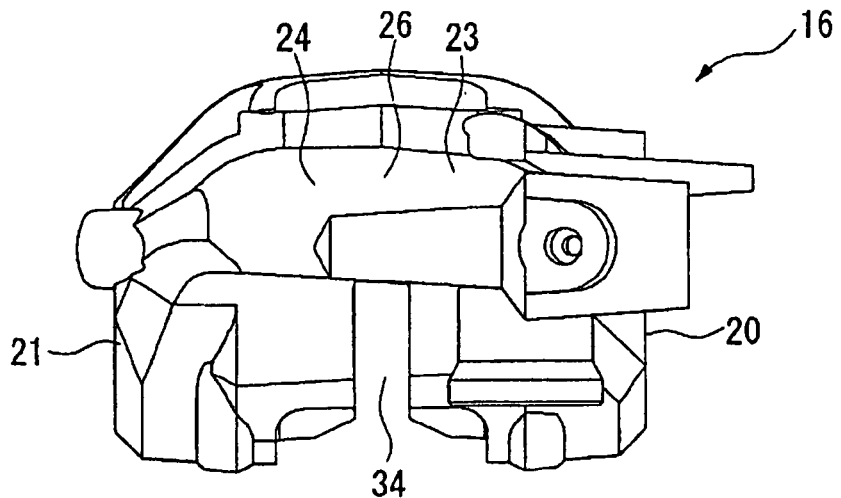
FIG. 24 is a left side view of the caliper body in the disc brake according to the embodiment of the present invention.
Figure 25:
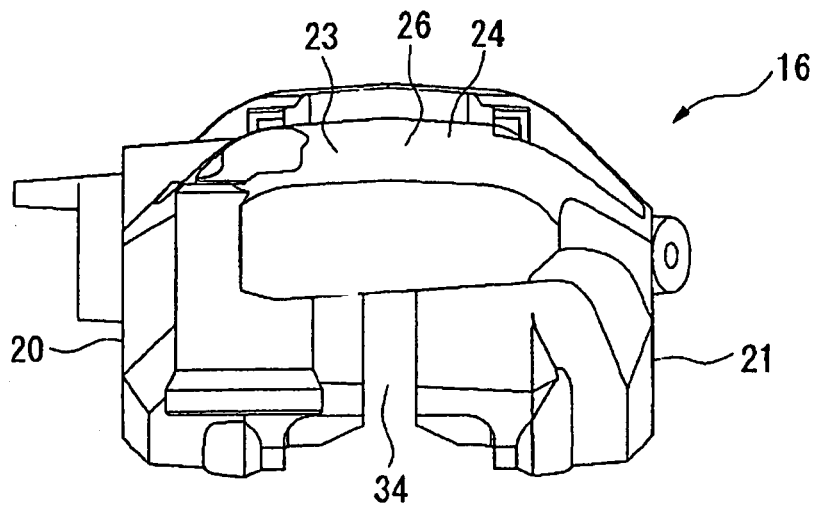
FIG. 25 is a right side view of the caliper body in the disc brake according to the embodiment of the present invention.
Figure 26:
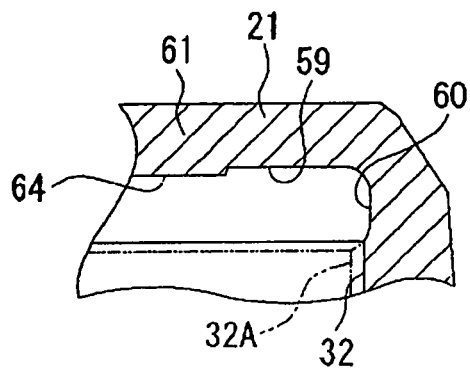
FIG. 26 is an enlarged cross-sectional view of an essential part of the caliper body in the disc brake according to the embodiment of the present invention, taken along the line B2-B2 in FIG. 17.

Further, as shown in FIGS. 20 and 22, a linear passage opening 75, with the bleeder mounting opening 40 for mounting the bleeder plug 39 being formed at an open end portion thereof, is formed by boring from an external surface of the outer-side cylinder portion 20 as viewed in a direction of rotation of the disc 12 so as to extend towards the top of the recess 63 of the outer-side cylinder portion 20. The bleeder mounting opening 40 is threaded. Since the bleeder mounting opening 40 is disposed at an upper position when the caliper body is mounted on a vehicle body, the passage opening 75 is formed by cutting from the external surface of a portion of the outer-side cylinder portion 20 that is located at an upper position when the caliper body is mounted on a vehicle body, and is communicated with the recess 63.

Further, a linear communication opening 76, with the pipe mount opening 38 for mounting a brake pipe from a master cylinder being formed at an open end portion thereof, is formed by boring from an external surface of the outer-side cylinder portion 20 as viewed in an axial direction of the disc 12 so as to extend towards an intermediate position in the caliper body 16. An intermediate part of the communication opening 76 intersects the passage opening 75 having the bleeder mounting opening 40. The pipe mount opening 38 is threaded. Further, a connection opening (passage opening) 77 is formed by boring from an external surface of the inner-side cylinder portion 21 as viewed in an axial direction of the disc 12 so as to extend towards the intermediate position in the caliper body 16. The connection opening 77 extends through the recess 63 of the inner-side cylinder portion 21 and intersects the communication opening 76. To close an open end of the connection opening 77 exposed at the external surface of the inner-side cylinder portion 21, a ball is struck into the open end of the connection opening 77 during assembly.

As described above, the adjacent inmost recess portions 60, that is, the bores 31, of the outer-side cylinder portion 20 arranged in a direction of rotation of the disc 12 are communicated with each other through the communication passage 62. The adjacent inmost recess portions 60, that is, the bores 31, of the inner-side cylinder portion 21 are also communicated with each other through the communication passage 62. The inmost recess portion 60 (that is, the bore 31) having the recess 63 in the outer-side cylinder portion 20 is communicated through this recess 63, the passage opening 75, the communication opening 76 and the connection opening 77 with the inmost recess portion 60 (that is, the bore 31) having the recess 63 in the inner-side cylinder portion 21. Thus, all the bores 31, i.e., the bores 31 arranged in a direction of rotation of the disc 12, and the bores 31 disposed in a face-to-face relationship in an axial direction of the disc 12 with the bores 31 arranged in the direction of rotation of the disc 12, are communicated with each other, and disposed in a single brake fluid flow passage. The communication opening 76 having the pipe mount opening 38, and the passage opening 75 and the connection opening 77, each intersecting the communication opening 76, form a connection passage 80 for communication between the bores 31 disposed on opposite sides of the disc 12 in an axial direction of the 12. Therefore, the communication opening 76 forms a part of the connection passage 80.

Thus, all the bores 31 are communicated with the pipe mount opening 38 formed at the open end portion of the communication opening 76. Therefore, brake fluid is introduced into the bores 31 through a brake pipe which is connected to the communication opening 76 during assembly. Further, all the bores 31 are communicated with the bleeder mounting opening 40 formed at the open end portion of the passage opening 75. Therefore, release of air is conducted through the bleeder plug 39, which is connected to the bleeder mounting opening 40 during assembly.

Then, other necessary machining operations are conducted and finally, all the interpositions 58, which are formed by casting on an inner side (as viewed in a radial direction of the disc) of the disc pass portions 26 between the outer-side torque bearing portions 23 and the inner-side torque bearing portions 24, are removed by milling, to thereby form pass recesses 34 for the disc 12 on an inner side (as viewed in a radial direction of the disc) of the disc pass portions 26 between the outer-side torque bearing portions 23 and the inner-side torque bearing portions 24, as shown in FIGS. 18, 19, 21 and 23 to 25. Thus, the disc pass portions 26 are formed between the outer-side torque bearing portions 23 and the inner-side torque bearing portions 24. Each disc pass portion 26 connects outer sides (as viewed in a radial direction of the disc) of the outer-side torque bearing portion 23 and the inner-side torque bearing portion 24, and has a smaller wall-thickness than the outer-side torque bearing portion 23 and the inner-side torque bearing portion 24.

The order of machining operations is not limited to the above embodiment and may be appropriately changed.

In the above embodiment, in the caliper body 16, the prepared hole 31A for the bore 31 into which the piston 17 is slidably fitted and the recess 63 extending from the bottom portion 61 of the prepared hole 31A outwardly in a radial direction of the prepared hole 31A are formed by means of the core 44 during casting. Therefore, an open end of the recess 63 which connects to the bore 31 can be formed with high precision. The linear passage opening 75 and the connection opening 77 are formed by cutting from an exterior surface of the caliper body 16 so as to extend to the recesses 63 which are formed with high precision relative to the bores 31. Therefore, it is not required to form the passage opening 75 and the connection opening 77 with high machining accuracy, resulting in ease of forming operations and high production efficiency. Further, it is unnecessary to form the passage opening 75 and the connection opening 77 while avoiding interference with an opening for mounting a separate bottom portion of the bore. Therefore, the positions of the passage opening 75 and the connection opening 77 can be determined with a high degree of freedom of design.

Of a plurality of bores 31 formed in a spaced relationship in a direction of rotation of the disc, the adjacent bores 31 are communicated with each other through the communication passage 62 which is formed during casting. The recess 63 is formed at a position corresponding to the top of the uppermost bore 31 when the caliper body is mounted on a vehicle body. The linear passage opening 75 for communication with the recess 63 is formed by cutting from an external surface of the caliper body 16 at a position on an upper side when the caliper body is mounted on a vehicle body. Therefore, release of air can be satisfactorily conducted through the communication passage 62, the recess 63 and the passage opening 75.

The plurality of bores 31 formed in a spaced relationship in a direction of rotation of the disc are communicated with each other through the communication passage 62, the recess 63 and the passage opening 75. Further, a part of the connection passage 80 for communication between the bores 31 disposed on opposite sides in an axial direction of the disc 12 is formed by the communication opening 76 which is formed by cutting from an exterior surface so as to intersect the passage opening 75. Therefore, it is possible to reduce the number of openings for communication between all the bores 31 arranged in a direction of rotation of the disc and arranged in an axial direction of the disc.

Figure 27:
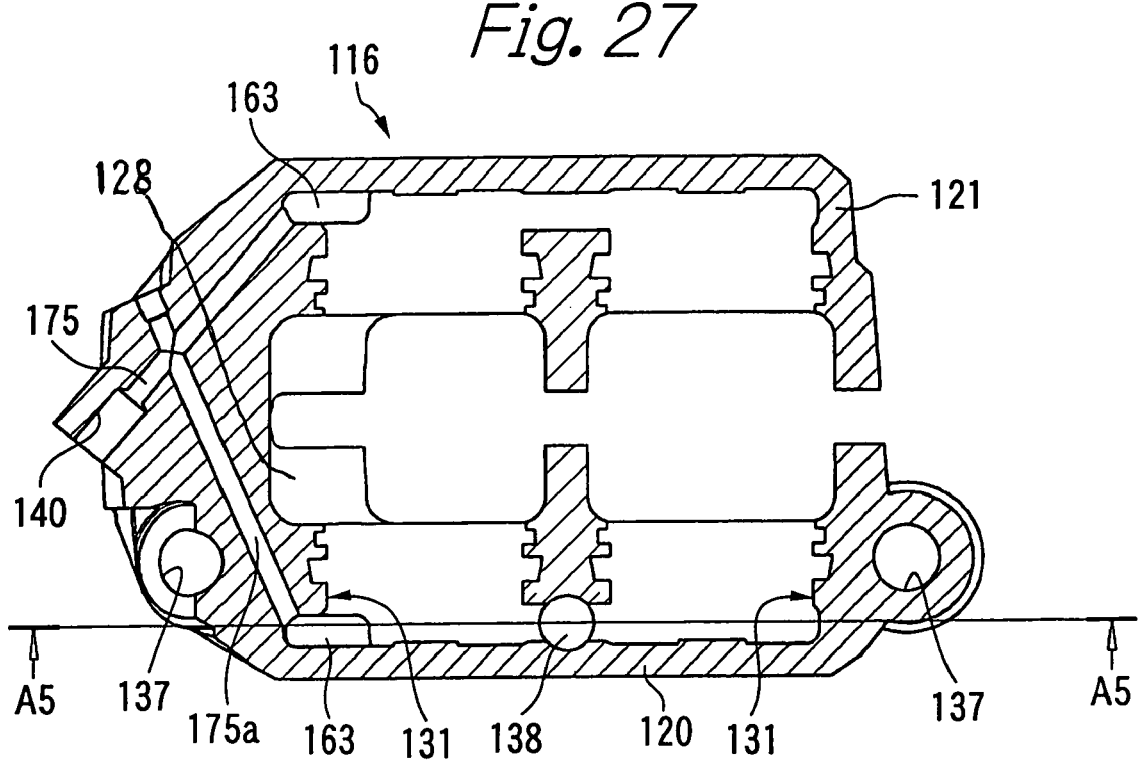
FIG. 27 is a cross-sectional view of the caliper body in the disc brake according to a second embodiment of the present invention, taken along the line B4-B4 in FIG. 28.
Figure 28:
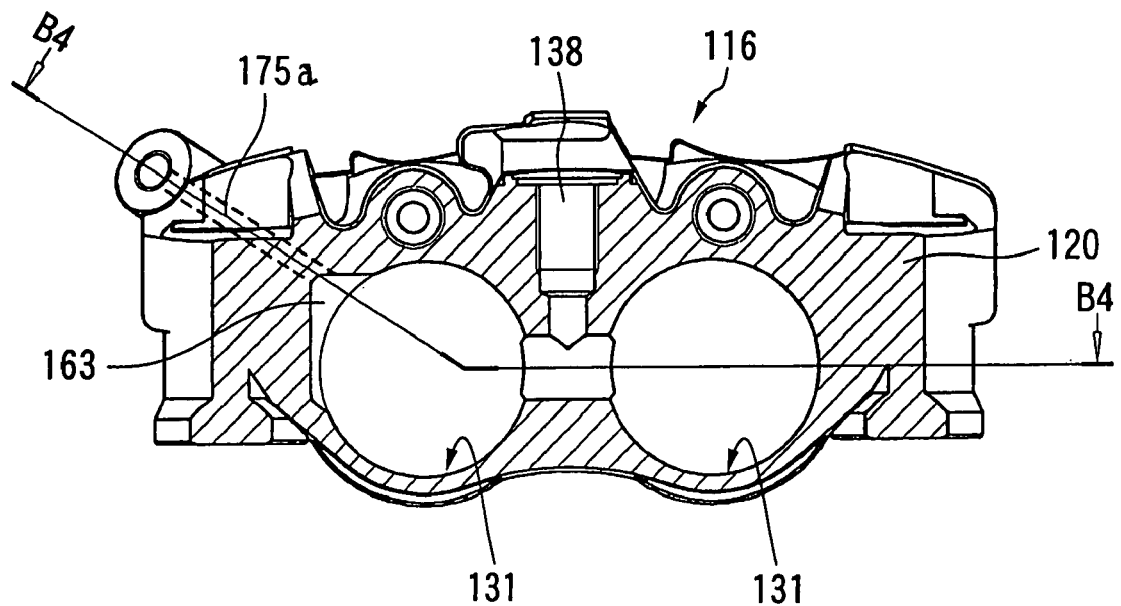
FIG. 28 is a cross-sectional view of the caliper body in the disc brake according to the second embodiment of the present invention, taken along the line A5-A5 in FIG. 27.

FIGS. 27 and 28 show a second embodiment of the present invention. In these drawings, elements corresponding to those in the first embodiment are designated by the corresponding reference numerals prefixed with 1. The constructions and effects of those elements are the same as those in the first embodiment, unless otherwise described.

In a caliper body 116 in the second embodiment, a pipe mount opening 138 is formed between two bores 131 of an outer-side cylinder portion 120. In the first embodiment, as shown in FIG. 20, a portion between the mounting bolt opening 37 and an adjacent exterior surface of the outer-side cylinder portion 20 is required to have a sufficiently large wall thickness for accommodating the pipe mount opening 38 and the communication opening 76 extending therefrom. In the second embodiment in which the pipe mount opening 138 is formed between the two bores 131, there is no need to provide such a portion having a large wall thickness. This achieves a reduction in weight of the caliper body.

Further, as is apparent from FIG. 27, by utilizing recesses 163 extending outwardly from the bottom portions of the bores 131, the recesses 163 on opposite sides of the caliper body 116 are communicated with each other through two passage openings 175 and 175a intersecting each other, and also communicated with a bleeder mounting opening 140. An outer end of the passage opening 175a is to be closed in the same manner as in the first embodiment. Thus, in the second embodiment, the same effects as those of the first embodiment can be obtained by using two linear passage openings, and therefore an operation for forming passage openings becomes easy. This is because the recesses 163 increases the freedom of design regarding the location of passage openings, and enable the linear passage opening 175a to pass through the wall between a pad-mounting space 128 and the mounting bolt opening 137 disposed adjacent to the recess 163.

In the second embodiment, a proximal end of the recess 163 extends along the circumference of the corresponding bore 131 to a position that is located inwardly from the center axis of the bore as viewed in a radial direction of the disc. This arrangement has the same effect as the first embodiment. That is, when the caliper body 116 is mounted in a vertical position with the recess 163 being located at the top of the corresponding bore 131, it is possible to more effectively prevent air from being trapped in the uppermost portion of the circumferential wall surface of the bore.

The position to which the proximal end of the recess 163 extends along the circumference of the bore 131 may be defined in a different way as well. The position may be located on a gravity line that is drawn from the center axis of the bore in a direction parallel to the direction of gravity when the caliper body 116 is mounted on a vehicle, wherein the intersection of the gravity line and the circumference of the bore near an inner end of the linear passage opening 175a communicating with the recess 163 is closer to the center of the disc than an intersection of a radius line drawn from the center of the bore to the inner end of the linear passage opening 175a and the circumference. In other words, the caliper is mounted on the vehicle substantially vertically as shown schematically in FIGS. 1 and 2. The position may also be located on the same side of the gravity line as the center of the disc.

What is claimed is:

1. A method of manufacturing a disc brake, the disk brake comprising:
   a pair of pads disposed on opposite sides of a disc;
   a caliper disposed so as to extend over the disc and adapted to be mounted on a vehicle body, the caliper having at least one bore; and
   at least one piston slidably held in the bore of the caliper, the piston being located on a side opposite to the disc relative to the corresponding pad,
   the method including:
   casting the caliper with at least one prepared hole for forming the bore into which the piston is slidably fitted and with a recess by means of a core, the recess extending from only part of the circumference of a bottom portion of the prepared hole and outwardly in a radial direction of the prepared hole; and
   boring a linear passage opening as to extend from an exterior surface of the caliper directly to the recess.

2. A method according to claim 1, wherein:
   the at least one bore comprises a plurality of bores formed in the caliper, the plurality of bores being arranged in a spaced relationship in a direction of rotation of the disc,
   the method further comprising forming in the caliper a communication passage for communicating between each pair of the bores that are adjacent to each other, wherein:
   said recess is formed at a position corresponding to the top of the uppermost bore of said plurality of bores when the caliper is mounted on the vehicle body, and
   said passage opening is formed so as to extend from the exterior surface of a portion of the caliper that is located at an upper position when the caliper is mounted on the vehicle body.

3. A method according to claim 2, wherein:
   said plurality of bores are disposed on each of the opposite sides of the disc in an axial direction of the disc; and
   the method further comprises forming a linear communication opening extending from the exterior surface of the caliper and intersecting said passage opening, the communication opening being adapted to form a part of a connection passage for allowing communication between the bores disposed on the opposite sides of the disc in the axial direction of the disc.

4. A method according to claim 2, wherein a bleeder mount opening for mounting of a bleeder valve for release of air is formed in the passage opening on a side opposite to the recess.

5. A method according to claim 1, wherein said bore has an inmost recess portion located at a bottom portion of the bore and the inmost portion has a larger diameter than an inner-diameter portion of the bore and wherein said inmost recess portion and said recess extending from only part of the inmost recess portion outwardly in a radial direction thereof, are formed by means of the core when the caliper is cast.

6. A method according to claim 5, wherein said passage opening is communicated with a distal end of the recess extending from the inmost recess portion outwardly in the radial direction thereof.

7. A method according to claim 1, wherein:
   the at least one bore comprises a plurality of bores arranged in a spaced relationship in a direction of rotation of the disc and each of the bores has an inmost recess portion located at the bottom portion of the bore and having a larger diameter than an inner-diameter portion of the corresponding bore; and
   the inmost recess portions, the recess extending from at least one of the inmost recess portions outwardly in a radial direction thereof, and a communication passage for communication between the inmost recess portions of the adjacent bores, are formed by means of the core during casting of the caliper.

8. A method according to claim 5, wherein the passage opening extends between a mounting bolt opening extending in a radial direction of the disc and a pad-mounting space.

9. A method according to claim 1, wherein said passage opening is communicated with a distal end of the recess extending from the bore outwardly in the radial direction thereof.

10. A method according to claim 9, wherein a proximal end of the recess extends, outwardly in a radial direction of the disc along the circumference of the bottom portion, from a position located on a gravity line drawn from the center axis of the bore in a direction parallel to the direction of gravity when the caliper is mounted on a vehicle, wherein the intersection of the gravity line and the circumference of the bore near an inner end of the linear passage opening communicating with the recess is closer to the center of the disc than an intersection of a radius line drawn from the center of the bore to the inner end of the linear passage opening and the circumference, or on the same side of said line as the center of the disc.

11. A method according to claim 1, wherein a proximal end of the recess extends, outwardly in a radial direction of the disc along the circumference of the bottom portion, from a position corresponding to the center axis of the corresponding bore or a position located inwardly from the center axis of the corresponding bore as viewed in the radial direction of the disc.

12. A method according to claim 1, wherein a bleeder mount opening for mounting of a bleeder valve for release of air is formed in the passage opening on a side opposite to the recess.

13. A method according to claim 1, wherein the passage opening extends between a mounting bolt opening extending in a radial direction of the disc and a pad-mounting space.

14. A method according to claim 1, wherein a distal end of the recess is located outwardly from a region occupied by the bore bottom portion as viewed in a direction of rotation of the disc, while being located radially outwardly from the center axis of the bore as viewed in a radial direction of the disc.

15. A method of manufacturing a disc brake comprising:
a pair of pads disposed on opposite sides of a disc;
a caliper disposed so as to extend over the disc and adapted to be mounted on a vehicle body, the caliper including an inner-side cylinder portion and an outer-side cylinder portion,
said inner-side cylinder portion having a first bore, and said outer-side portion having a second bore; and
a first piston slidably fitted in said first bore, the first piston being located on an opposite side of the corresponding pad relative to the disc;
the method including:
casting the caliper with first and second prepared holes for forming the first and second bores and with a recess by means of a core, the recess extending from only part of the circumference of a bottom portion of the second prepared hole and outwardly in a radial direction thereof; and
boring a linear passage opening so as to extend from an exterior surface of the caliper directly to the recess,
wherein the inner-side and outer-side cylinder portions are formed as a one-piece member by casting; and
the first and second bores are formed by machining the first and second prepared holes from portions thereof on a side of a space between the inner-side cylinder portion and the outer-side cylinder portion, to thereby maintain a closed state of bottom portions of the first and second bores obtained by casting.

16. A method according to claim 15, wherein:
inmost recess portions are located at the bottom portions of the first and second prepared holes, respectively, and have a larger diameter than inner-diameter portions of the prepared holes and, wherein said inmost portions and said recesses extending from only part of the inmost recess portions outwardly in a radial direction thereof, are formed by means of the core when the caliper is cast; and
the inner-diameter portions of the first and second bores are formed by machining the first and second prepared holes formed by means of the core when the caliper is cast from portions thereof on a side of the space between the inner-side cylinder portion and the outer-side cylinder portion.

17. A method according to claim 16, wherein said passage opening is communicated with a distal end of the recess extending from the inmost recess portion outwardly in the radial direction thereof.

18. A method according to claim 16, wherein a proximal end of the recess extends, outwardly in a radial direction of the disc along the circumference of the inmost recess portion, from a position corresponding to the center axis of the bore or a position located inwardly from the center axis of the bore as viewed in the radial direction of the disc.

19. A method according to claim 16, wherein a distal end of the recess is located outwardly from a region occupied by the corresponding inmost recess portion as viewed in a direction of rotation of the disc, while being located radially outwardly from the center axis of the corresponding bore as viewed in a radial direction of the disc.

20. A method according to claim 15, wherein said passage opening is communicated with a distal end of the recess extending from the second prepared hole outwardly in the radial direction thereof.

* * * * *